United States Patent
Matsuzawa

(10) Patent No.: US 10,802,768 B1
(45) Date of Patent: Oct. 13, 2020

(54) PRINTER SETTING VALUE COMMUNICATION SYSTEM

(71) Applicant: FUJI XEROX CO., LTD., Tokyo (JP)

(72) Inventor: Misaki Matsuzawa, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/548,046

(22) Filed: Aug. 22, 2019

(30) Foreign Application Priority Data

Mar. 19, 2019 (JP) ................. 2019-050737

(51) Int. Cl.
  *G06F 15/00* (2006.01)
  *G06F 3/12* (2006.01)
  *G06K 1/00* (2006.01)
  *H04N 1/00* (2006.01)

(52) U.S. Cl.
  CPC .......... *G06F 3/1204* (2013.01); *G06F 3/1232* (2013.01); *G06F 3/1254* (2013.01); *G06F 3/1257* (2013.01); *H04N 1/00474* (2013.01)

(58) Field of Classification Search
  CPC .... G06F 3/1204; G06F 3/1232; G06F 3/1254; G06F 3/1257; H04N 1/00474
  USPC ................. 358/1.1, 1.15, 1.13, 1.14
  See application file for complete search history.

(56) References Cited

U.S. PATENT DOCUMENTS

| 2014/0168698 A1* | 6/2014 | Okada ................ G06F 3/1236 358/1.15 |
| 2016/0173709 A1* | 6/2016 | Kouno ............... H04N 1/00244 358/1.15 |

FOREIGN PATENT DOCUMENTS

JP        2012-190057 A     10/2012

* cited by examiner

*Primary Examiner* — Douglas Q Tran
(74) *Attorney, Agent, or Firm* — Oliff PLC

(57) ABSTRACT

An information processing system includes an external apparatus and an information processing apparatus. The external apparatus includes a storage configured to store model information indicating a model of an image processing apparatus and function information regarding a function of the image processing apparatus, and a print setting screen generator configured to generate a print setting screen in which a setting value transmitted from the information processing apparatus is reflected, by using the storage. The information processing apparatus includes an acquiring unit configured to acquire a setting value of a function from the image processing apparatus, and a transmitter configured to transmit the setting value acquired by the acquiring unit to the external apparatus.

13 Claims, 15 Drawing Sheets

FIG. 14
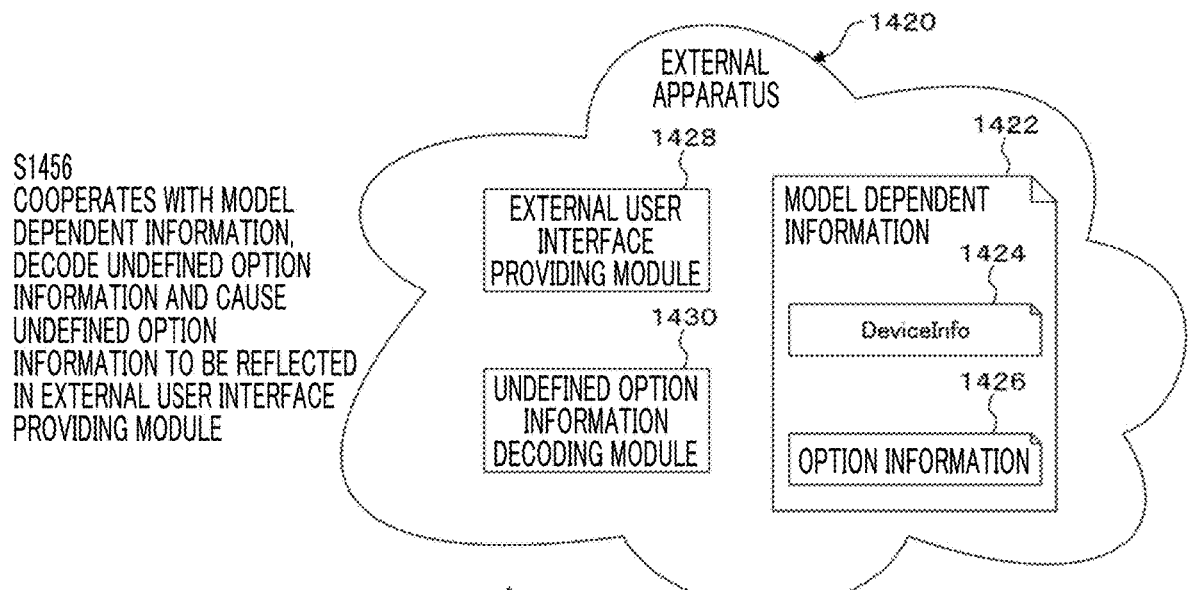
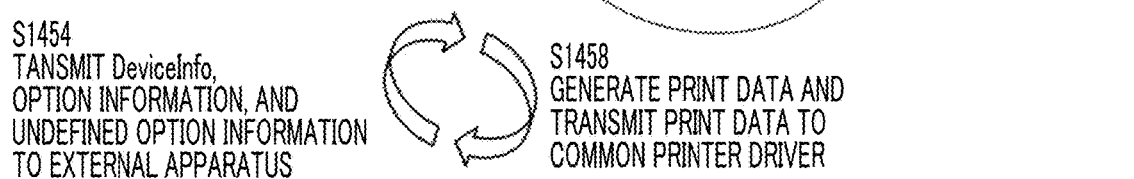
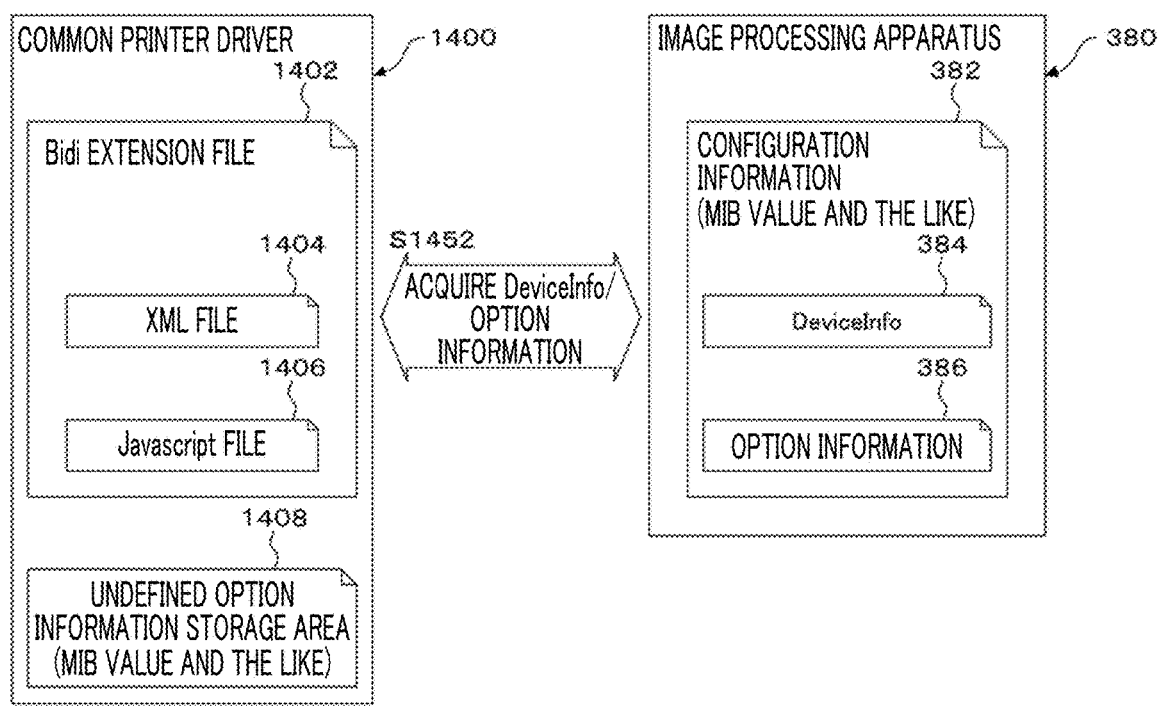

PRINTER SETTING VALUE COMMUNICATION SYSTEM

CROSS-REFERENCE TO RELATED APPLICATIONS

This application is based on and claims priority under 35 USC 119 from Japanese Patent Application No. 2019-050737 filed Mar. 19, 2019.

BACKGROUND

(i) Technical Field

The present disclosure relates to an information processing system.

(ii) Related Art

JP-A-2012-190057 discloses an information processing apparatus in which, at the time of performing printing with a printer, a printer driver that has already been installed can perform many functions unique to the printer, without updating the printer driver with a version of a printer driver corresponding to the printer. To this end, JP-A-2012-190057 discloses that, in a case where it is determined that a version of the printer driver already installed in the apparatus does not match a version of the printer driver corresponding to the printer performing a new printing task, a PC model dependent file management tool allows a user to select whether or not print is performed by the printer driver, and then in a case where printing by the printer driver is selected, the PC model dependent file management tool makes the printer perform printing only with the function of the printer corresponding to the printer driver.

In an information processing apparatus on which a printer driver for unspecified models such as a model common printer driver is installed, setting values of functions that are not defined in the printer driver, such as new functions of a new model, cannot be reflected in print settings.

SUMMARY

Aspects of non-limiting embodiments of the present disclosure relate to an information processing system capable of reflecting, in a print setting, even a setting value of a function that is not defined in a printer driver installed in an information processing apparatus.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing system including: an external apparatus; and an information processing apparatus, in which the external apparatus includes a storage configured to store model information indicating a model of an image processing apparatus and function information regarding a function of the image processing apparatus, and a print setting screen generator configured to generate a print setting screen in which a setting value transmitted from the information processing apparatus is reflected, by using the storage, and the information processing apparatus includes an acquiring unit configured to acquire a setting value of a function from the image processing apparatus, and a transmitter configured to transmit the setting value acquired by the acquiring unit to the external apparatus.

BRIEF DESCRIPTION OF THE DRAWINGS

Exemplary embodiment(s) of the present disclosure will be described in detail based on the following figures, wherein:

FIG. 14 is a diagram illustrating a processing example according to the present exemplary embodiment.

DETAILED DESCRIPTION

Hereinafter, an example of an exemplary embodiment to implement the disclosure will be described with reference to the accompanying drawings.

Figure 1:
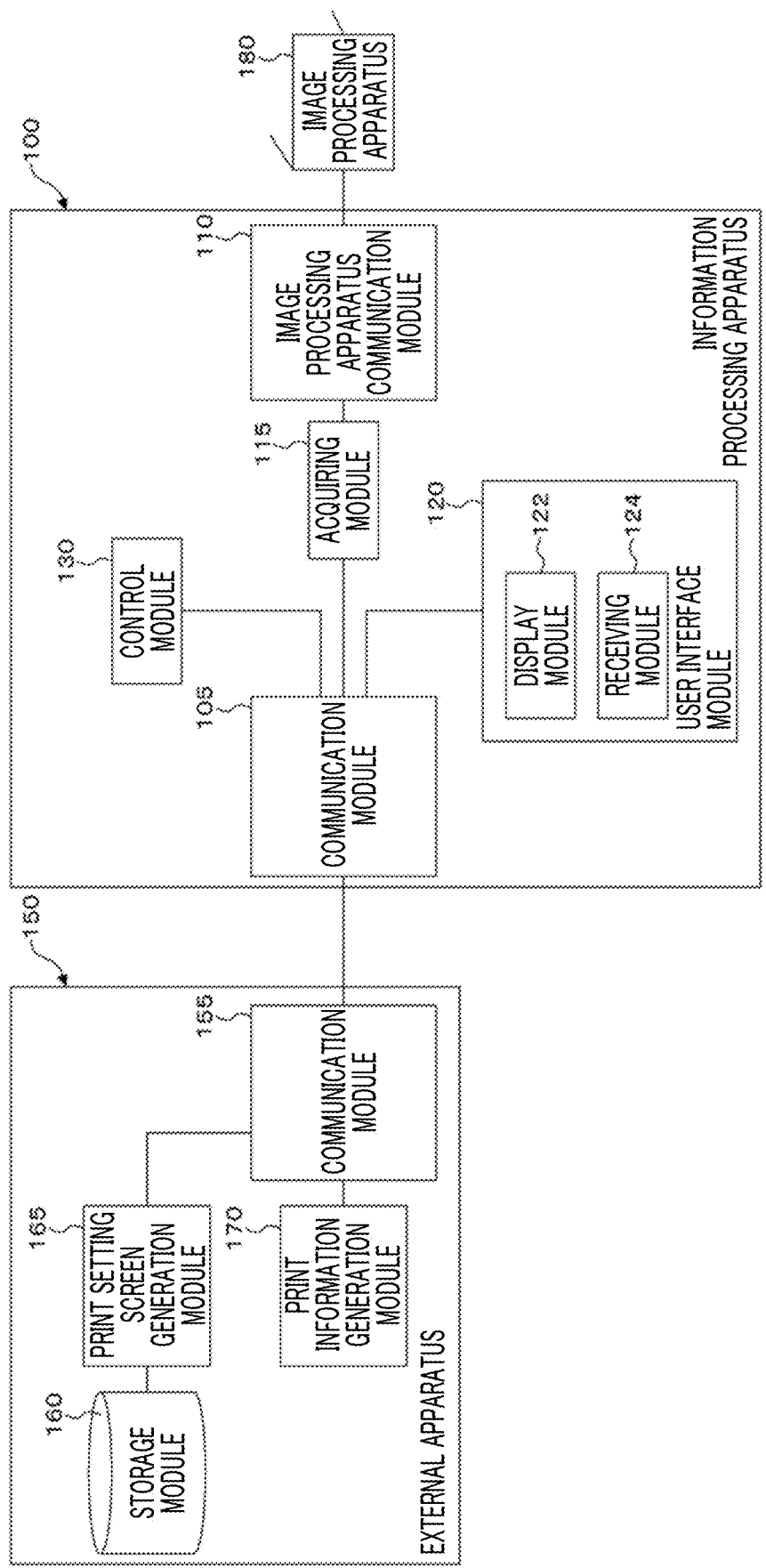
FIG. 1 is a conceptual module configuration diagram illustrating a configuration example according to the present exemplary embodiment.

FIG. 1 is a conceptual module configuration diagram illustrating a configuration example of the present exemplary embodiment.

Meanwhile, the term "module" refers to a component such as software (as an interpretation of "software", including computer programs) and hardware, which are generally capable of being logically separated. Consequently, the term "module" in the present exemplary embodiment not only refers to modules in a computer program, but also to modules in a hardware configuration. Thus, the present exemplary embodiment also serves as a description of a computer program (for example, a program that causes a computer to execute respective operations, a program that causes a computer to function as respective units, or a program that causes a computer to implement respective functions), a system, and a method for inducing functionality as such modules. Meanwhile, although "store", "cause something to store", and phrases similar thereto are used in the description for the sake of convenience, these expressions mean that, in the case of the exemplary embodiment regarding a computer program, the computer program is made to be stored in a storage apparatus or is controlled so as to be stored in the storage apparatus. In addition, while modules may be made to correspond with function on a one-to-one basis, some implementations may be configured such that one program constitutes one module, such that one program constitutes plural modules, or conversely, such that plural programs constitute one module. Moreover, plural modules may be executed by one computer, but one module may also be executed by plural computers in a distributed or parallel computing environment. Meanwhile, a single module may also contain other modules. In addition, the term "connection" may be used hereinafter to denote logical connections (for examples, such as the transmission and reception of data, instructions, a referential relationship between pieces of data, and log-in) in addition to physical connections. The term "predetermined" refers to something being determined prior to the processing in question, and obviously denotes something that is determined before a process according to the present exemplary embodiment starts, but may also denote something that is determined after a process according to the present exemplary embodiment has started but before the processing in question, according to conditions or states at that time, or according to conditions or states up to that time. In the case where there are plural "predetermined values", the predetermined values may be different values from each other, or two or more values ("two or more values" obviously also include all values) may be the same. Additionally, statements to the effect of "B is conducted in the case of A" are used to denote that a determination is made regarding whether or not A holds true, and B is conducted in the case where it is determined that A holds true. However, this excludes cases where the determination of whether or not A holds true may be omitted. Additionally, the case of the listing of things such as "A, B, and C" is illustrative listing unless otherwise indicated, and includes a case where only one of them is selected (for example, only A).

In addition, the terms "system" and "apparatus" not only encompass configurations in which plural computers, hardware, or apparatus are connected by a communication tool such as a network ("network" includes connections that support 1-to-1 communication), but also encompass configurations implemented by a single computer, hardware, or apparatus. The terms "apparatus" and "system" are used interchangeably. Obviously, the term "system" does not include merely artificially arranged social mechanisms (that is, social systems).

Also, every time a process is conducted by each module or every time plural processes are performed within a module, information to be processed is retrieved from a storage apparatus, and the processing results are written back to the storage apparatus after the processing. Consequently, a description of the retrieval from a storage apparatus before processing and the writing back to a storage apparatus after processing may be omitted in some cases. Meanwhile, the storage apparatus herein may include a hard disk drive, a random access memory (for short, RAM), an external storage medium, a storage apparatus accessed via a communication line, and registers and the like in a central processing unit (for short, CPU).

An information processing system including an information processing apparatus 100, an external apparatus 150 and an image processing apparatus 180 according to the present exemplary embodiment has a printing function.

The information processing apparatus 100 can use the image processing apparatus 180. However, in the information processing apparatus 100, a program for using the image processing apparatus 180 (for example, a printer driver or the like corresponds to the program, which will be used in the following illustration or description) is installed. It should be noted that this program does not enable to use all functions of the image processing apparatus 180. This is true for an example in which the printer driver is a model common printer driver and the image processing apparatus 180 has functions which are not supported by the model common printer driver. Specifically, the image processing apparatus 180 released after the model common printer driver is installed may have a new function which is not supported by the model common printer driver. Even in this case, the functions in the image processing apparatus 180 are enabled by acquiring print setting values of functions not defined in the printer driver using a print setting screen generated by the external apparatus 150.

In addition, the information processing apparatus 100 and the external apparatus 150 are connected via a communication line. The information processing apparatus 100 and the image processing apparatus 180 are connected via a communication line. Additionally, a connection may be performed by an interface for connection to a peripheral device such as universal serial bus (for short, USB).

The external apparatus 150 includes a communication module 155, a storage module 160, a print setting screen generation module 165, and a print information generation module 170. The external apparatus 150 has function information on the image processing apparatus 180, generates the print setting screen for using functions that are not supported by the printer driver installed in the information processing apparatus 100, generates print information for using the function, transmits the print information to the information processing apparatus 100, and causes the image processing apparatus 180 to perform the printing, by using the function in the information processing apparatus 100.

The image processing apparatus 180 that is the target of the external apparatus 150 is at least the image processing apparatus 180 used by the information processing apparatus 100 in question, but, it may be all or any kind of image processing apparatus 180. Particularly, in a case where the external apparatus 150 is managed by the manufacturer of the image processing apparatus 180, the external apparatus 150 may manage function information on all of the manufactured image processing apparatuses 180.

The communication module 155 is connected to the print setting screen generation module 165, the print information generation module 170, and a communication module 105 of the information processing apparatus 100. The communication module 155 communicates with the information processing apparatus 100. The communication module 155 receives information transmitted from the information processing apparatus 100 and passes the information to the print setting screen generation module 165 and the print information generation module 170. Further, the information transmitted from the print setting screen generation module 165 and the print information generation module 170 is transmitted to the information processing apparatus 100.

The storage module 160 is connected to the print setting screen generation module 165. The storage module 160 stores model information indicating the model of the image processing apparatus 180 and function information on the function of the image processing apparatus 180.

The print setting screen generation module 165 is connected to the communication module 155 and the storage module 160. The print setting screen generation module 165 generates the print setting screen in which a setting value transmitted from the information processing apparatus 100 is reflected, by using the storage module 160. The print setting screen generation module 165 transmits the generated print setting screen to the information processing apparatus 100 via the communication module 155. The setting value is information necessary to use the function of the image processing apparatus 180. For example, the setting value is information indicating whether to use a target function and, in a case where there are plural options for using the function, the options. As a specific example, in case of the function of a stapler, the setting value is information on whether to use the stapler, a position and the number of the staples, and the like.

In addition, the print setting screen generation module 165 may transmit the storage location in model information corresponding to model information received from the information processing apparatus 100 to the information processing apparatus 100 via the communication module 155. The storage module 160 stores the storage location in model information corresponding to model information. Therefore, the print setting screen generation module 165 may search for the storage location in the model information from the model information, by using the storage module 160.

Moreover, the print setting screen generation module 165 may generate the print setting screen regarding a function different from functions in the print setting screen generated by the information processing apparatus 100.

The print information generation module 170 is connected to the communication module 155. The print information generation module 170 receives the print setting value set using the print setting screen from the information processing apparatus 100 via the communication module 155. The print information generation module 170 generates print information based on the print setting value, and transmits the print information to the information processing apparatus 100.

The information processing apparatus 100 includes the communication module 105, an image processing apparatus communication module 110, an acquiring module 115, a user interface module 120, and a control module 130.

The communication module 105 is connected to the acquiring module 115, the user interface module 120, the control module 130, and the communication module 155 of the external apparatus 150. The communication module 105 communicates with the external apparatus 150. The communication module 105 receives information transmitted from the external apparatus 150 and passes the information to the acquiring module 115, the user interface module 120, and the control module 130. The communication module 105 also transmits information passed from the acquiring module 115, the user interface module 120, and the control module 130 to the external apparatus 150. For example, the communication module 105 transmits the setting value acquired by the acquiring module 115 to the external apparatus 150.

The image processing apparatus communication module 110 is connected to the acquiring module 115 and the image processing apparatus 180. The image processing apparatus communication module 110 communicates with the image processing apparatus 180. The image processing apparatus communication module 110 receives information transmitted from the image processing apparatus 180 and passes the information to the acquiring module 115. Additionally, the image processing apparatus communication module 110 transmits the information passed from the acquiring module 115 to the image processing apparatus 180.

The acquiring module 115 is connected to the communication module 105 and the image processing apparatus communication module 110. The acquiring module 115 acquires a setting value of the function from the image processing apparatus 180.

Further, the acquiring module 115 may transmit model information which indicates the model acquired from the image processing apparatus 180 to the external apparatus 150 via the communication module 105.

Additionally, the acquiring module 115 may receive the storage location from the external apparatus 150 via the communication module 105, and may acquire a setting value stored in the storage location of the image processing apparatus 180.

In addition, the acquiring module 115 may store, in advance, the storage location of undefined function information in the image processing apparatus 180. The acquiring module 115 may acquire the setting values stored in the respective storage locations of the image processing apparatus 180. Of course, the image processing apparatus 180 stores the undefined function information in the storage location.

The user interface module 120 includes a display module 122 and a receiving module 124, and is connected to the communication module 105. The user interface module 120 has a function of a user interface in the information processing apparatus 100. That is, a print setting screen, a message, and the like are displayed to an operator, and an operation by the operator is received.

The display module 122 receives the print setting screen transmitted from the external apparatus 150 via the communication module 105. The display module 122 displays the print setting screen on a display apparatus of the information processing apparatus 100. The display apparatus is, for example, a liquid crystal display, an organic Electro-Luminescence (for short, EL) display, and the like, and may have a touch panel function.

The receiving module 124 receives a print setting value set by the operator by using the print setting screen displayed by the display module 122. For example, an operation on the touch panel, a user's operation (including a line of sight, a gesture, a sound, and the like) using a mouse, a keyboard, a camera, a microphone, and the like may be received.

The receiving module 124 transmits the print setting value received using the print setting screen to the external apparatus 150 via the communication module 105.

The control module 130 is connected to the communication module 105. The control module 130 receives print information transmitted from the external apparatus 150 via the communication module 105.

The control module 130 controls the image processing apparatus 180 to perform printing by using the received print information.

The image processing apparatus 180 is connected to the image processing apparatus communication module 110 of the information processing apparatus 100. The image processing apparatus 180 performs printing according to print instruction of the information processing apparatus 100. The image processing apparatus 180 may be referred to as a device, and is, for example, a printing apparatus, a printer, or a multifunction machine (the multifunction machine refers to an image processing apparatus including any two or more functions of a scanner, a printer, a copier, and a facsimile).

Figure 2:
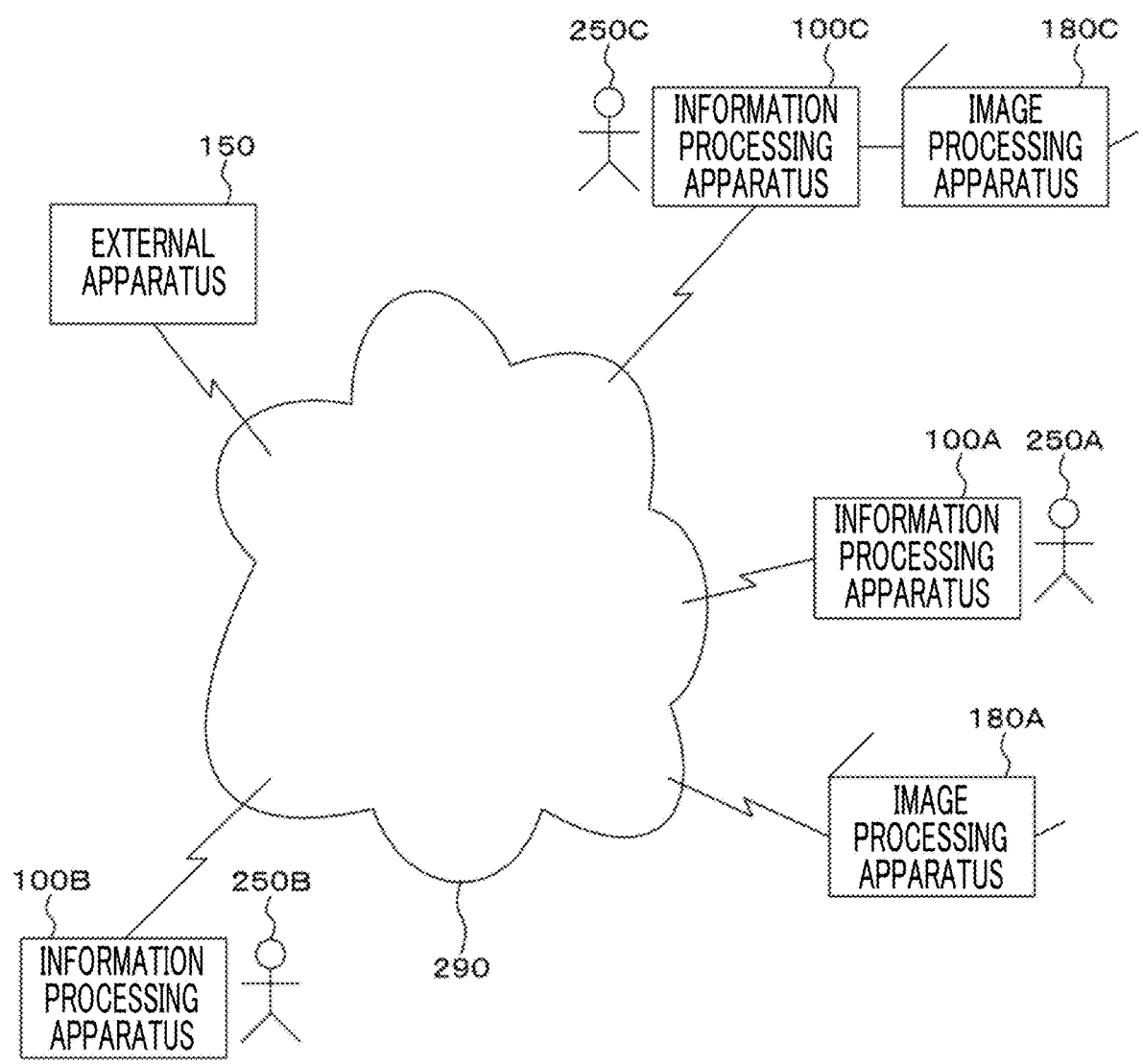
FIG. 2 is a diagram illustrating a configuration example of a system using the present exemplary embodiment.

FIG. 2 is a diagram illustrating a configuration example of a system using the present exemplary embodiment.

An information processing apparatus 100A, an information processing apparatus 100B, an information processing apparatus 100C, the external apparatus 150, and an image processing apparatus 180A are connected via a communication line 290. The information processing apparatus 100C is connected to the image processing apparatus 180C. The communication line 290 may be a wireless line, a wired line, or a combination thereof, and may be, for example, the Internet, an intranet, and the like as communication infrastructure. In addition, a function of the external apparatus 150 may be implemented as a cloud service.

The information processing apparatus 100 is a terminal used by a user 250 and is, for example, a personal computer, a portable information communication device (including a portable telephone, a smartphone, a mobile device, a wearable computer, and the like as a portable information communication device), and the like. The user 250 uses the information processing apparatus 100 to cause the image processing apparatus 180 to print a document. For example, each of a user 250A and a user 250B causes the image processing apparatus 180A to print the document by using the information processing apparatus 100A and the information processing apparatus 100B. A user 250C uses the information processing apparatus 100C to cause the image processing apparatus 180C to print a document.

For example, a common printer driver corresponding to the image processing apparatuses 180 of plural models is installed in the information processing apparatus 100. As long as the common printer driver corresponds to the image processing apparatus 180, all functions of the image processing apparatus 180 can be used. However, for example, in a case where the image processing apparatus 180 released after the common printer driver has been installed is used, in a case where the image processing apparatus 180 is upgraded and has a new function, or in a case where a post-processing apparatus such as a stapler is added in the image processing apparatus 180, the image processing apparatus 180 may have functions which are not supported by the common printer driver. In these cases, it is necessary to develop a new common printer driver that supports the function and install the developed common printer driver onto each information processing apparatus 100.

In the present exemplary embodiment, the external apparatus 150 corresponding to functions which are not supported by the common printer driver is prepared, and the information processing apparatus 100 can use the new function of the image processing apparatus 180 while using the previous common printer driver. That is, there is no need to install a new common printer driver for using the new functions of the image processing apparatus 180.

Figure 3:
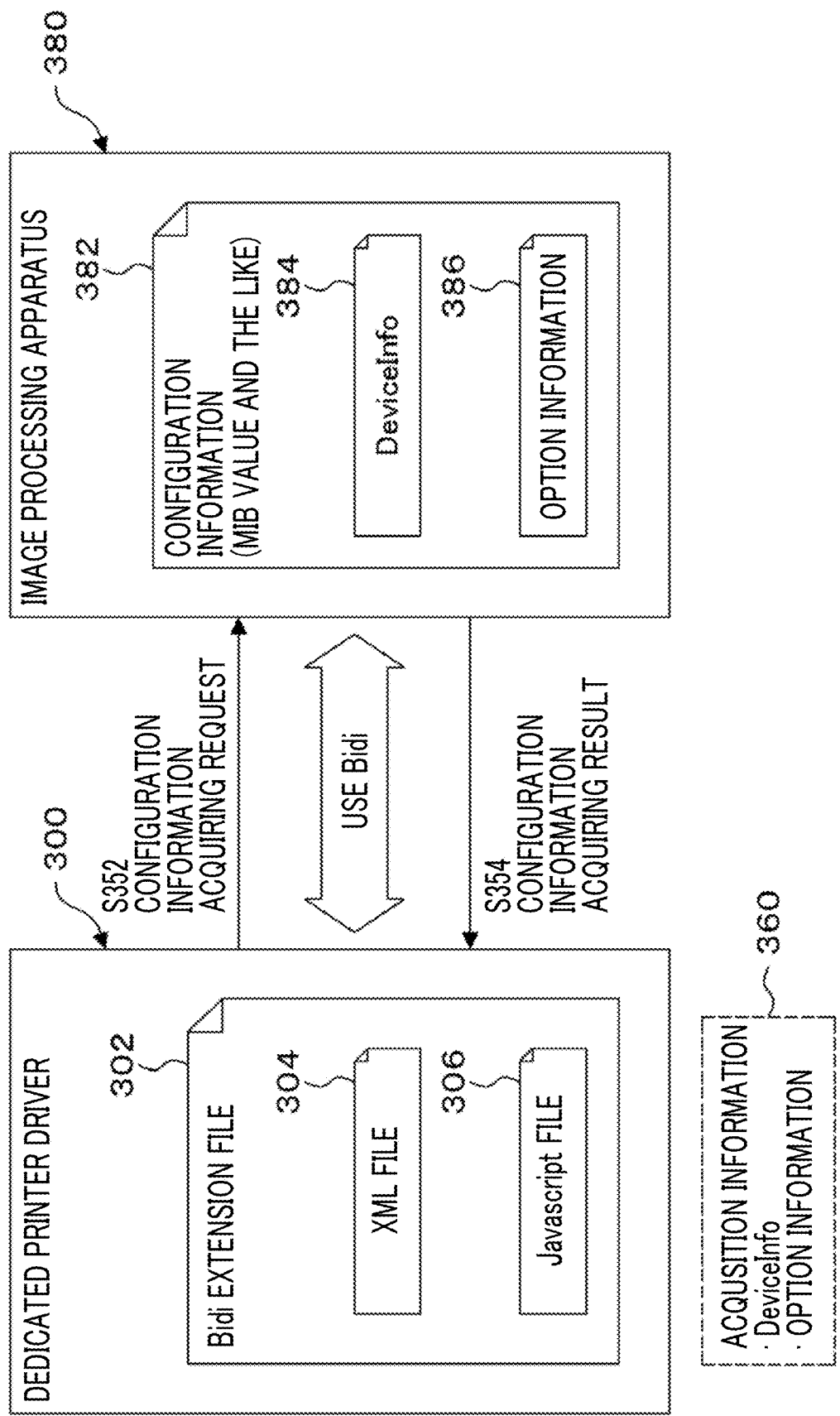
FIG. 3 is a diagram illustrating a print processing example using a dedicated printer driver in a case where the present exemplary embodiment is not used.
Figure 4:
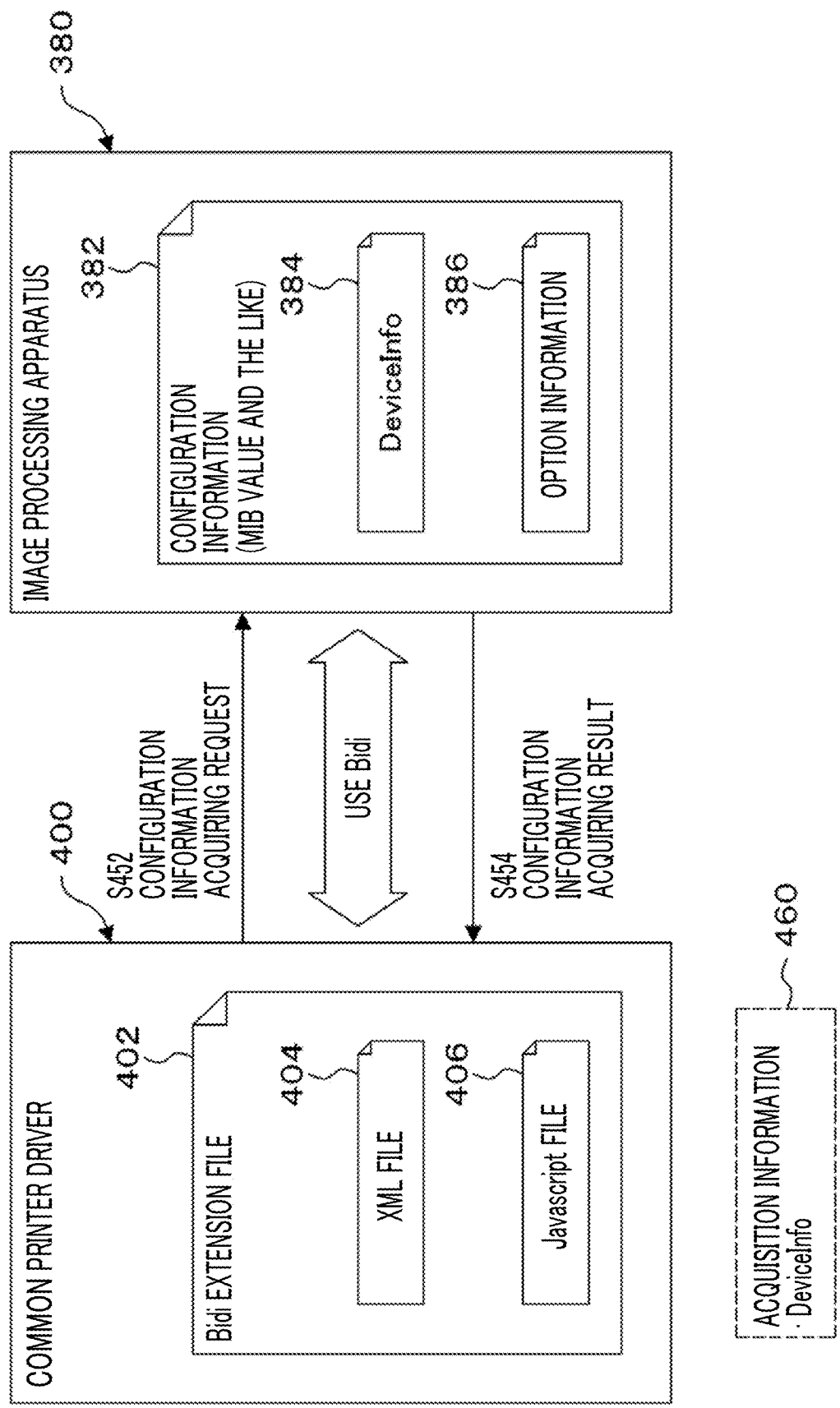
FIG. 4 is a diagram illustrating a print processing example using a common printer driver in a case that the present exemplary embodiment is not used.
Figure 5:
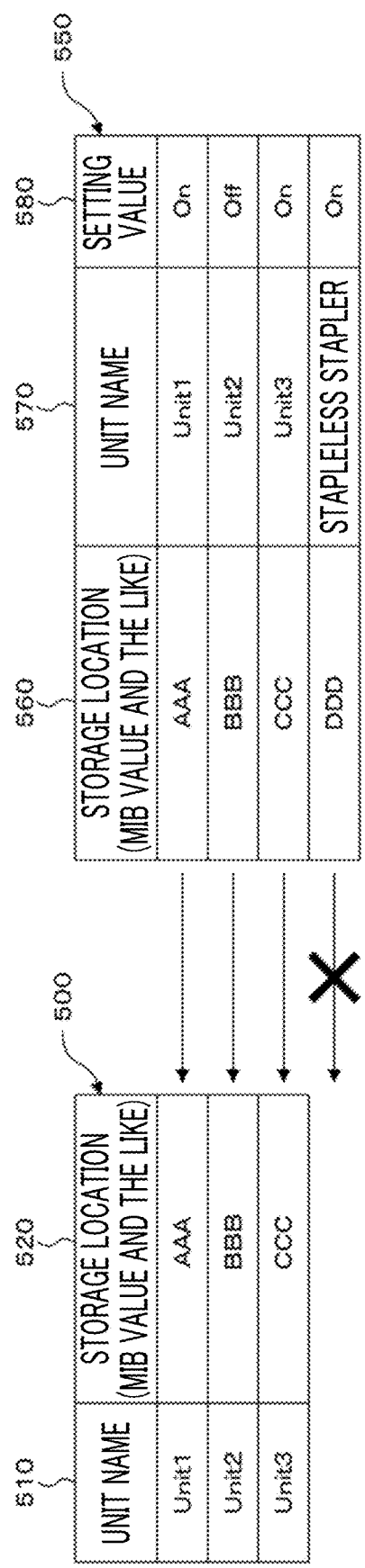
FIG. 5 is a diagram illustrating an example in which undefined new functions cannot be acquired in a case that the common printer driver is used.

FIGS. 3 to 5 are diagrams illustrating print processing examples using the printer driver in a case where the present exemplary embodiment is not used. What is called print processing in the related art will be described.

A bidirectional communication (Bidi) supports two-way communication between the printer driver (a dedicated printer driver 300 in an example of FIG. 3) and the image processing apparatus (an image processing apparatus 380 in an example of FIG. 3), and thus makes it possible for the printer driver to acquire configuration information on the image processing apparatus.

For example, an image processing apparatus that a stapler unit can be mounted as an option is assumed. In the image processing apparatus which a stapler unit is not mounted in an initial state, the printer driver does not detect the stapler unit. In a case where the stapler unit is mounted, the printer driver can detect the setting of the stapler unit by using Bidi.

Examples of a connection method of Bidi includes USB, WSD, TCP/IP (SNMP), and it is necessary to define a value corresponding to the configuration information (for example, a MIB value) defined in the image processing apparatus, in the printer driver. Therefore, a model dedicated printer driver developed for each model implements Bidi by correcting the printer driver according to the configuration information in the image processing apparatus with the release of a model having information on a new option unsupported (for example, a unit mountable to the image processing apparatus and the like).

In addition, in a case where the model common printer driver is not corrected in the same way as the model dedicated printer driver, accurate image processing apparatus information and the option information cannot be acquired. Since the option information on the new unit is defined in a new storage location of the image processing apparatus, the printer driver cannot detect whether the new unit is mounted on the image processing apparatus without the definition in the printer driver. That is, the model common printer driver has to be developed and re-installed to acquire the unsupported option information in spite of the fact that it is compatible with plural models.

This may occur in both a printer driver in the related art and a V4 printer driver of a new architecture. The printer driver in the related art implements Bidi internally in the program without changing a mechanism of Bidi, and the V4 printer driver implements Bidi by explicitly defining and using it as a Bidi extension file (XML, JavaScript (registered trademark) format). Hereinafter, the V4 printer driver will be described by way of example.

In FIGS. 3 and 4, examples are shown in which, in order to reflect the setting of a "stapleless stapler" which is a new unit in the print setting screen, the dedicated printer driver 300 and a common printer driver 400 acquire a mounting or non-mounting state of the new unit, from the image processing apparatus 380.

FIG. 3 is a diagram illustrating a print processing example using the Bidi of the dedicated printer driver 300 in a case where the present exemplary embodiment is not used.

The dedicated printer driver 300 stores a Bidi extension file 302, and the Bidi extension file 302 includes an XML file 304 and a JavaScript file 306. In the Bidi extension file 302, there is a definition of the "stapleless stapler".

The image processing apparatus 380 stores configuration information 382, and the configuration information 382 includes DeviceInfo 384 and option information 386. The configuration information 382 includes, for example, a MIB value. DeviceInfo 384 includes a model name, a manufacturer, and the like. The option information 386 indicates a state in which the "stapleless stapler" is mounted on the image processing apparatus 380. In addition, the DeviceInfo 384 is an example of model information. The option information 386 is an example of function information.

The dedicated printer driver 300 and the image processing apparatus 380 executes step S352 and step S354 by using Bidi.

In step S352, the dedicated printer driver 300 requests the image processing apparatus 380 to acquire the configuration information 382.

In step S354, the image processing apparatus 380 transmits the configuration information 382 to the dedicated printer driver 300.

Acquisition information 360 by the dedicated printer driver 300 includes the DeviceInfo 384 and the option information 386.

That is, since the dedicated printer driver 300 is developed for each image processing apparatus 380, the information held by the image processing apparatus 380 can be accurately acquired.

FIG. 4 is a diagram illustrating a print processing example using Bidi of the common printer driver 400 in a case that the present exemplary embodiment is not used.

The common printer driver 400 stores a Bidi extension file 402, and the Bidi extension file 402 includes an XML file 404 and a JavaScript file 406.

Similarly to the example shown in FIG. 3, the common printer driver 400 and the image processing apparatus 380 executes step S452 and step S454 by using Bidi.

In step S452, the common printer driver 400 requests the image processing apparatus 380 to acquire the configuration information 382.

In step S454, the image processing apparatus 380 transmits the configuration information 382 to the common printer driver 400.

Since the "stapleless stapler" is undefined in the Bidi extension file 402, acquisition information 460 by the common printer driver 400 includes only the DeviceInfo 384 and the option information 386 regarding the "stapleless stapler" cannot be acquired.

Option information 386 that can be acquired by the common printer driver 400 and option information 386 that cannot be acquired thereby will be described using an example in FIG. 5.

FIG. 5 is a diagram illustrating an example in which undefined new functions cannot be acquired in a case that the common printer driver 400 is used.

Definition information 500 indicates the definition in the common printer driver 400 and is a part of the Bidi extension file 402.

The definition information 500 includes a unit name field 510 and a storage location field 520. The unit name field 510 stores a unit name. The storage location field 520 stores a storage location (the MIB value and the like).

Definition information 550 indicates the definition in the image processing apparatus 380, and is a part of the option information 386.

The definition information 550 includes a storage location field 560, a unit name field 570, and a setting value field 580. The storage location field 560 stores a storage location (the MIB value and the like). The unit name field 570 stores a unit name. The setting value field 580 stores a setting value. For example, the setting value includes information indicating whether the function is available.

Information on the first to third lines of the definition information 550 is also defined in the definition information 500. That is, the common printer driver 400 can acquire values (specifically, the values in the setting value field 580 of the definition information 550) set in the storage location of Unit 1, Unit 2, and Unit 3.

However, the definition information 500 does not include definition corresponding to the "stapleless stapler" defined in the fourth line of the definition information 550. That is, since "stapleless stapler" is not defined in the common printer driver 400, it is not possible to detect the "stapleless stapler" unit.

The dedicated printer driver 300 illustrated in the example of FIG. 3 can acquire the option information 386 of the new unit "stapleless stapler" to clarify the storage location of the definition ("stapleless stapler") of the image processing apparatus 380 at a development stage.

On the other hand, it is not possible to acquire the option information 386 of the "stapleless stapler" which is a new unit undefined by the existing common printer driver 400 shown in the example of FIG. 4.

Therefore, in order for the common printer driver 400 to acquire option information on a new unit, the Bidi extension file 402 has to be changed (so-called version up) in the same manner as the Bidi extension file 302 in the dedicated printer driver 300.

Figure 6:
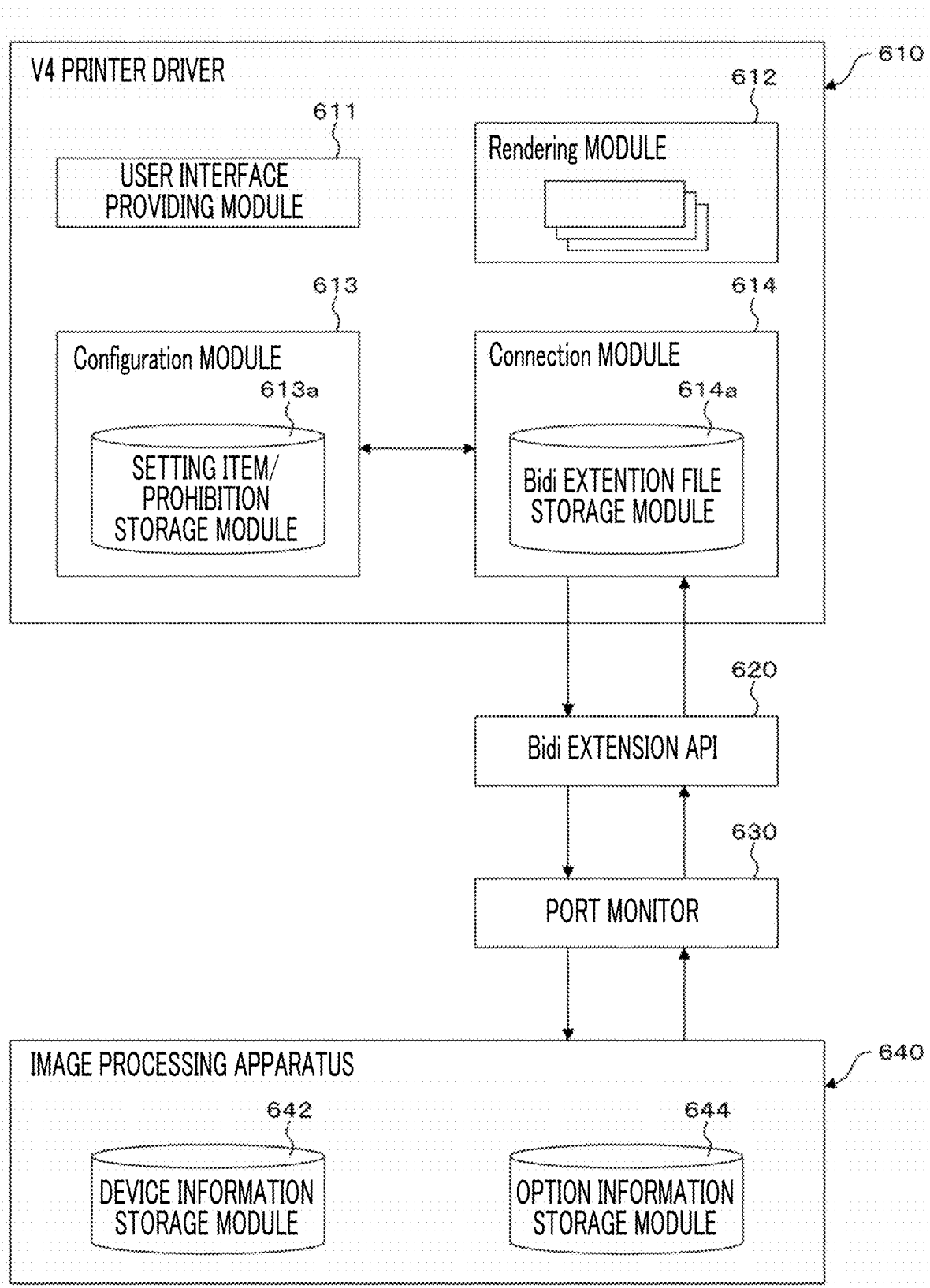
FIG. 6 is a specific module configuration diagram in a case where a V4 printer driver in the related art is used.

FIG. 6 is a specific module configuration diagram in a case where a V4 printer driver 610 in the related art is used.

The V4 printer driver 610 is a standard printer driver (specifically, Windows (registered trademark) architecture type), and performs printing (specifically, generation of print data). A standard configuration includes a configuration module 613, a user interface providing module 611, a rendering module 612, and a connection module 614. The Core part as a printer driver and the application part that performs expansion processing are operated in conjunction.

The user interface providing module 611 displays the print setting screen of the printer driver, and receives a user's operation on the print setting screen.

The rendering module 612 generates print data that can be processed by an image processing apparatus 640. So-called rendering processing is performed.

The configuration module 613 includes a setting item/prohibition storage module 613a and is connected to the connection module 614. The configuration module 613 has information on setting items and prohibition definitions that the printer driver has, and responds to print settings (PrintTicket) and the configuration information (PrintCapabilities).

The setting item/prohibition storage module 613a stores, for example, a GPD/PPD.

The connection module 614 includes a Bidi extension file storage module 614a, and is connected to the configuration module 613 and a Bidi extension API 620. The connection module 614 controls bidirectional (two-way) communication with the printer. The API for inquiring the status of the printer is called, and the acquired information is transmitted to the configuration module 613. In addition, a Bidi extension file in which instructions for acquiring device information and option information are defined is held. In addition, there is no explicit file in printer drivers prior to the V4 printer driver.

The Bidi extension file storage module 614a stores, for example, XML/JavaScript (corresponding to the XML file 304 and the JavaScript file 306 shown in the example of FIG. 3).

The Bidi extension API 620 is connected to the connection module 614 and a port monitor 630 of the V4 printer driver 610. The Bidi extension API 620 operates to use JavaScript code only during USB Bidi extension. In the printer driver prior to the V4 printer driver, the program directly corresponds to option information on an image processing apparatus 640.

The port monitor 630 is connected to the Bidi extension API 620 and the image processing apparatus 640. The port monitor 630 mediates acquisition of device function and option information instructed by the Bidi extension API 620.

The image processing apparatus 640 includes a device information storage module 642 and an option information storage module 644, and is connected to the port monitor 630. The device information storage module 642 and the option information storage module 644 store the MIB value and the like. Moreover, device information stored in the device information storage module 642 is information indicating a manufacturer, a model name, and the like, of the image processing apparatus 640 as a target. Option information stored in the option information storage module 644 is information indicating which configuration option (specifically, a unit such as the stapleless stapler) is mounted and which setting is made in the image processing apparatus 640 as the target.

In FIG. 6, for example, an image processing apparatus 640 supporting the "stapleless stapler" function and mounting the stapleless stapler unit is installed. In addition, the V4 printer driver 610 that does not support the "stapleless stapler" function is installed in an information processing apparatus that instructs the image processing apparatus 640 to perform printing.

Step S1) The V4 printer driver 610 acquires device information and option information other than a mounting or non-mounting state of the "stapleless stapler" unit from the image processing apparatus 640 by using Bidi.

Step S2) The V4 printer driver 610 causes the model dependent information in the acquired range to be reflected in the print setting screen. That is, on this print setting screen, it is not possible to specify the "stapleless stapler".

Figure 7:
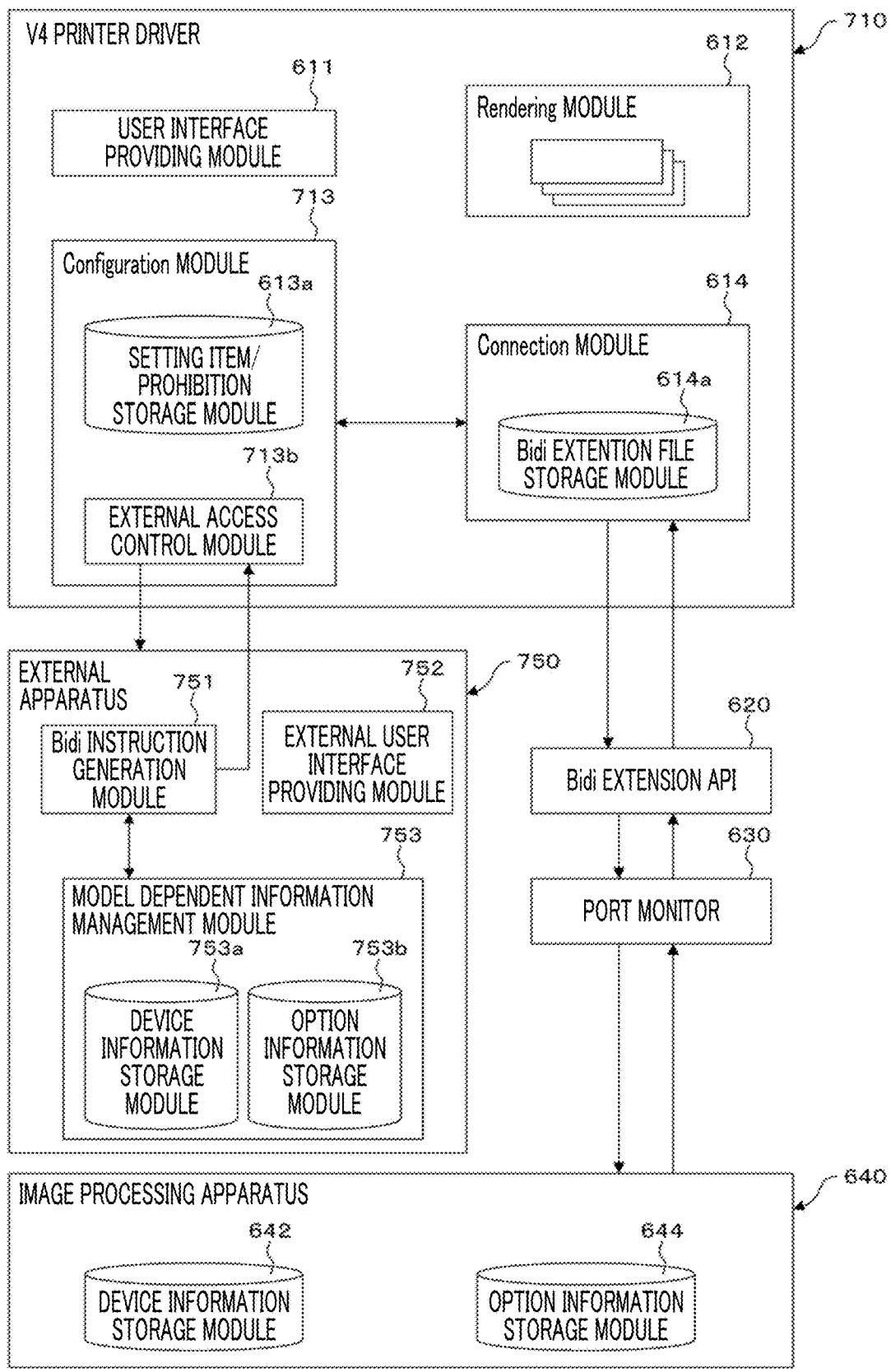
FIG. 7 is a specific module configuration diagram in a case where the V4 printer driver and an external apparatus are used according to the present exemplary embodiment.

FIG. 7 is a specific module configuration diagram in a case where a V4 printer driver 710 and an external apparatus 750 are used according to the present exemplary embodiment.

In addition, the same parts as those shown in the example of FIG. 6 are denoted by the same reference numerals, and description thereof will not be repeated. Furthermore, with regard to a correspondence relationship with FIG. 1, the V4 printer driver 710 is an example of the information processing apparatus 100 shown in the example of FIG. 1, the external apparatus 750 is an example of the external apparatus 150, and the image processing apparatus 640 is an example of the image processing apparatus 180.

The V4 printer driver 710 includes the user interface providing module 611, the rendering module 612, a configuration module 713, and the connection module 614.

The configuration module 713 includes the setting item/prohibition storage module 613a and an external access control module 713b, and is connected to the connection module 614.

The external access control module 713b is connected to the external apparatus 750. The external access control module 713b transmits the device information acquired by Bidi at the time of accessing the external apparatus 750. Also, external access control module 713b receives a new Bidi instruction acquired from the external apparatus 750.

The external apparatus 750 includes a Bidi instruction generation module 751, an external user interface providing module 752, and a model dependent information management module 753. The external apparatus 750 is connected to the external access control module 713b of the configuration module 613 in the V4 printer driver 610. The external apparatus 750 is an apparatus (for example, a Web environment, a cloud environment, and the like) that operates outside of the V4 printer driver 710. The external apparatus 750 manages the model dependent information on all released image processing apparatuses 640, and has the print setting screen in the Bidi instruction generation and the external user interface.

The Bidi instruction generation module 751 is connected to the model dependent information management module 753 and the external access control module 713b of the configuration module 613 in the V4 printer driver 610. Based on the device information received by the configuration module 613, the Bidi instruction generation module 751 makes an inquiry to the model dependent information management module 753. An instruction is generated which allows option information on the target image processing apparatus 640 to be acquired based on the storage location (the MIB value and the like) of specific option information, and is transmitted to the external access control module 713b.

An external user interface providing module 752 displays a print setting screen in which a new unit and a new function that extends the user interface providing module 611 of the V4 printer driver 710 are reflected, and transmits print data generated in a format recognizable by the V4 printer driver 710 to the V4 printer driver 710. That is, the external user interface providing module 752 displays only unsupported functions unrecognizable by the V4 printer driver 710 on the user interface, and generates print data to be added to the print data generated by the user interface providing module 611. Additionally, as to the display of the user interface, a web screen may be generated, the web screen may be transmitted to the V4 printer driver 710 or the information processing apparatus 100 in which the V4 printer driver 710 is installed, and the web screen may be displayed on the web browser.

The model dependent information management module 753 includes a device information storage module 753a and an option information storage module 753b, and is connected to the Bidi instruction generation module 751. The model dependent information management module 753 holds associated data such that device information in the device information storage module 753a and a storage location (the MIB value and the like) of option information in the option information storage module 753b are uniquely determined. The storage location of the option information is specified based on the device information. Here, the option information is a list of option information that can be mounted on the target image processing apparatus 640.

The processing flow by Bidi is the same between the printer driver in the related art and V4 printer driver, and a processing example in the V4 printer driver is shown here. Of course, the present exemplary embodiment can be applied to both the printer driver in the related art and the V4 printer driver.

Figure 8A:
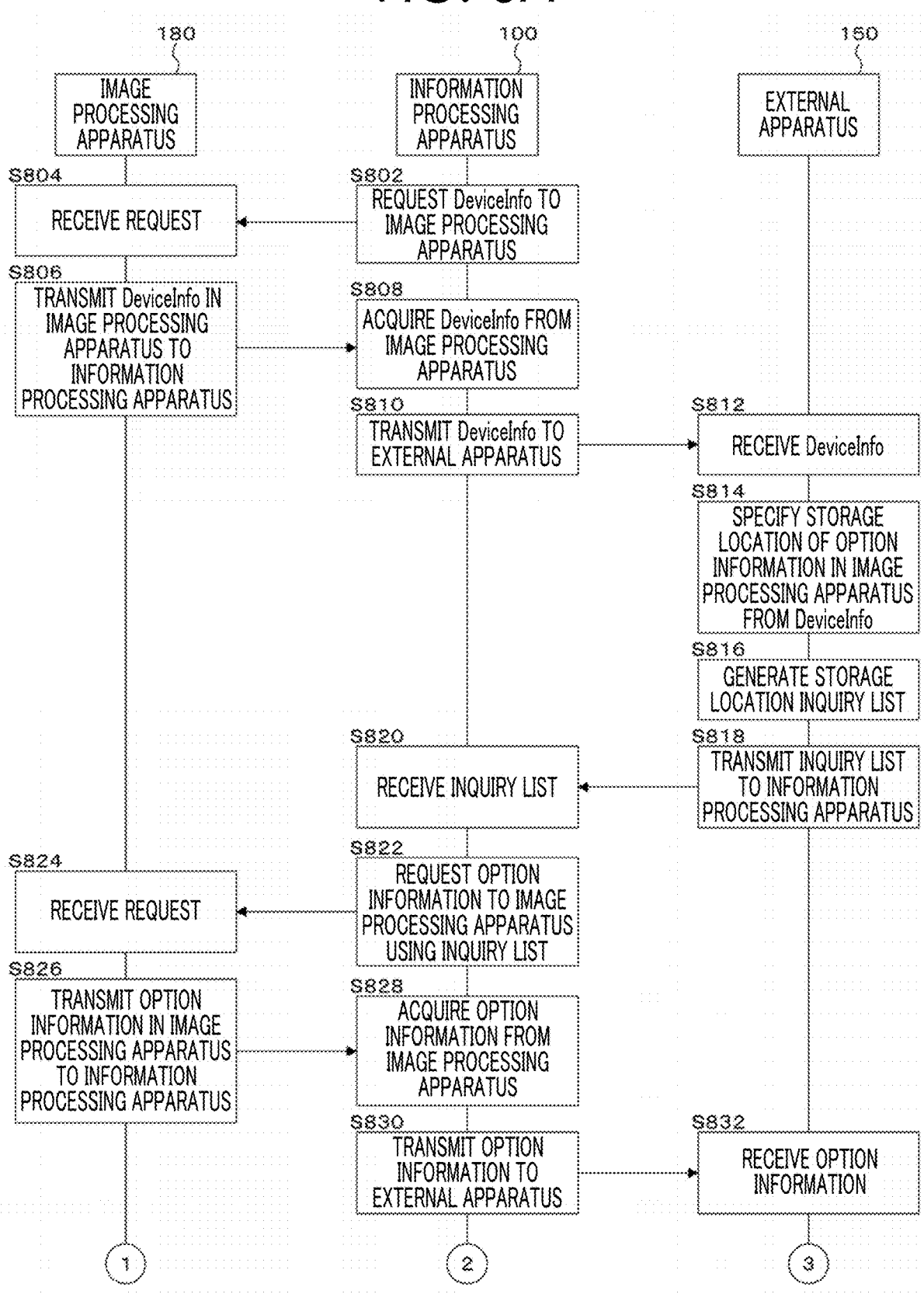
FIG. 8A is a flowchart illustrating a processing example according to the present exemplary embodiment.
Figure 8B:
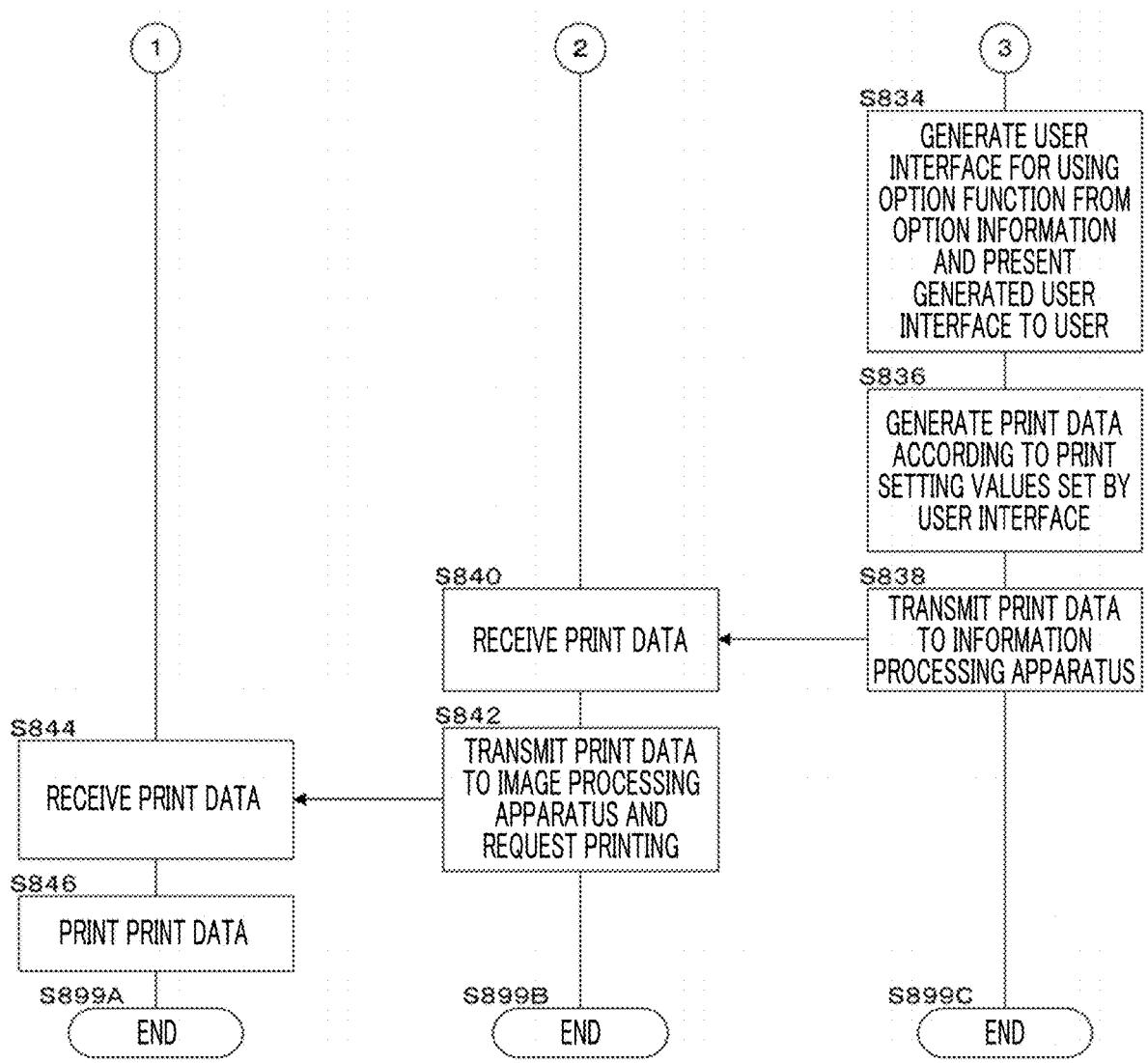
FIG. 8B is a flowchart illustrating a processing example according to the present exemplary embodiment.

FIGS. 8A and 8B are flowcharts illustrating a processing example according to the present exemplary embodiment.

In step S802, the information processing apparatus 100 requests DeviceInfo, which is an example of the model information, to the image processing apparatus 180.

In step S804, the image processing apparatus 180 receives the request.

In step S806, the image processing apparatus 180 transmits DeviceInfo in the image processing apparatus 180 to the information processing apparatus 100.

In step S808, the information processing apparatus 100 acquires DeviceInfo from the image processing apparatus 180.

In step S810, the information processing apparatus 100 transmits DeviceInfo to the external apparatus 150.

In step S812, the external apparatus 150 receives DeviceInfo.

In step S814, the external apparatus 150 specifies, from DeviceInfo, a storage location of option information which is an example of function information in the image processing apparatus 180.

In step S816, the external apparatus 150 generates a storage location inquiry list.

In step S818, the external apparatus 150 transmits the inquiry list to the information processing apparatus 100.

In step S820, the information processing apparatus 100 receives the inquiry list.

In step S822, the information processing apparatus 100 requests the option information to the image processing apparatus 180 by using the inquiry list.

In step S824, the image processing apparatus 180 receives the request.

In step S826, the image processing apparatus 180 transmits option information in the image processing apparatus 180 to the information processing apparatus 100.

In step S828, the information processing apparatus 100 acquires the option information from the image processing apparatus 180.

In step S830, the information processing apparatus 100 transmits the option information to the external apparatus 150.

In step S832, the external apparatus 150 receives the option information.

In step S834, the external apparatus 150 generates a user interface for utilizing the optional function from the option information, and presents the user interface to the user.

In step S836, the external apparatus 150 generates print data according to the print setting values set by the user interface.

In step S838, the external apparatus 150 transmits the print data to the information processing apparatus 100.

In step S840, the information processing apparatus 100 receives the print data.

In step S842, the information processing apparatus 100 transmits the print data to the image processing apparatus 180, and requests printing.

In step S844, the image processing apparatus 180 receives the print data.

In step S846, the image processing apparatus 180 prints the print data.

Figure 9:
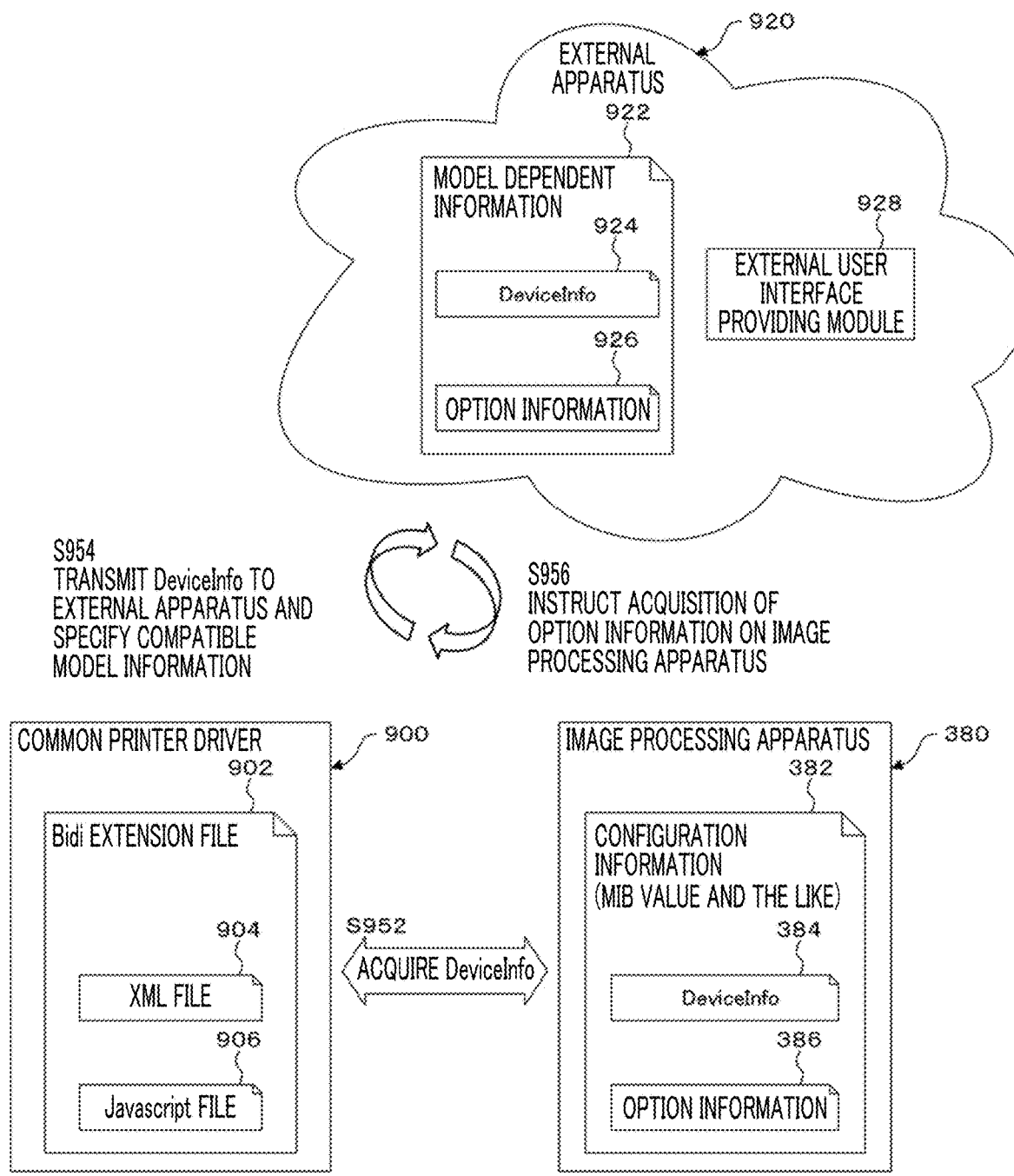
FIG. 9 is a diagram illustrating a processing example according to the present exemplary embodiment.

A more detailed processing example will be described. FIG. 9 is a diagram illustrating a processing example according to the present exemplary embodiment. In addition, a common printer driver 900 corresponds to an example of the information processing apparatus 100 and the V4 printer driver 710, an external apparatus 920 corresponds to an example of the external apparatus 150 and the external apparatus 750, and the image processing apparatus 380 corresponds to an example of the image processing apparatus 180.

The processing example shown in FIG. 9 is processing for acquiring configuration information on a new unit of the image processing apparatus 380 by the common printer driver 900. For example, a stapleless stapler will be described as an example of a new unit.

The common printer driver 900 stores a Bidi extension file 902, and the Bidi extension file 902 includes an XML file 904 and a JavaScript file 906. In the Bidi extension file 902, a definition of a "stapleless stapler" does not exist.

The image processing apparatus 380 stores the configuration information 382, and the configuration information 382 includes the DeviceInfo 384 and the option information 386. The configuration information 382 includes, for example, a MIB value. DeviceInfo 384 includes a model name, a manufacturer, and the like. The option information 386 includes information indicating that the "stapleless stapler" is mounted on the image processing apparatus 380.

An external apparatus 920 includes model dependent information 922 and an external user interface providing module 928. The external apparatus 920 manages the support status for each model of the image processing apparatus 380. The model dependent information 922 includes DeviceInfo 924 and option information 926.

The DeviceInfo 924 includes device information on the image processing apparatus 380.

The option information 926 includes, for example, information indicating whether the "stapleless stapler" can be mounted. In the example, information indicating that the "stapleless stapler" can be mounted, is set for the target image processing apparatus 380.

The external user interface providing module 928 performs the same processing as the print setting screen generation module 165.

Figure 11:
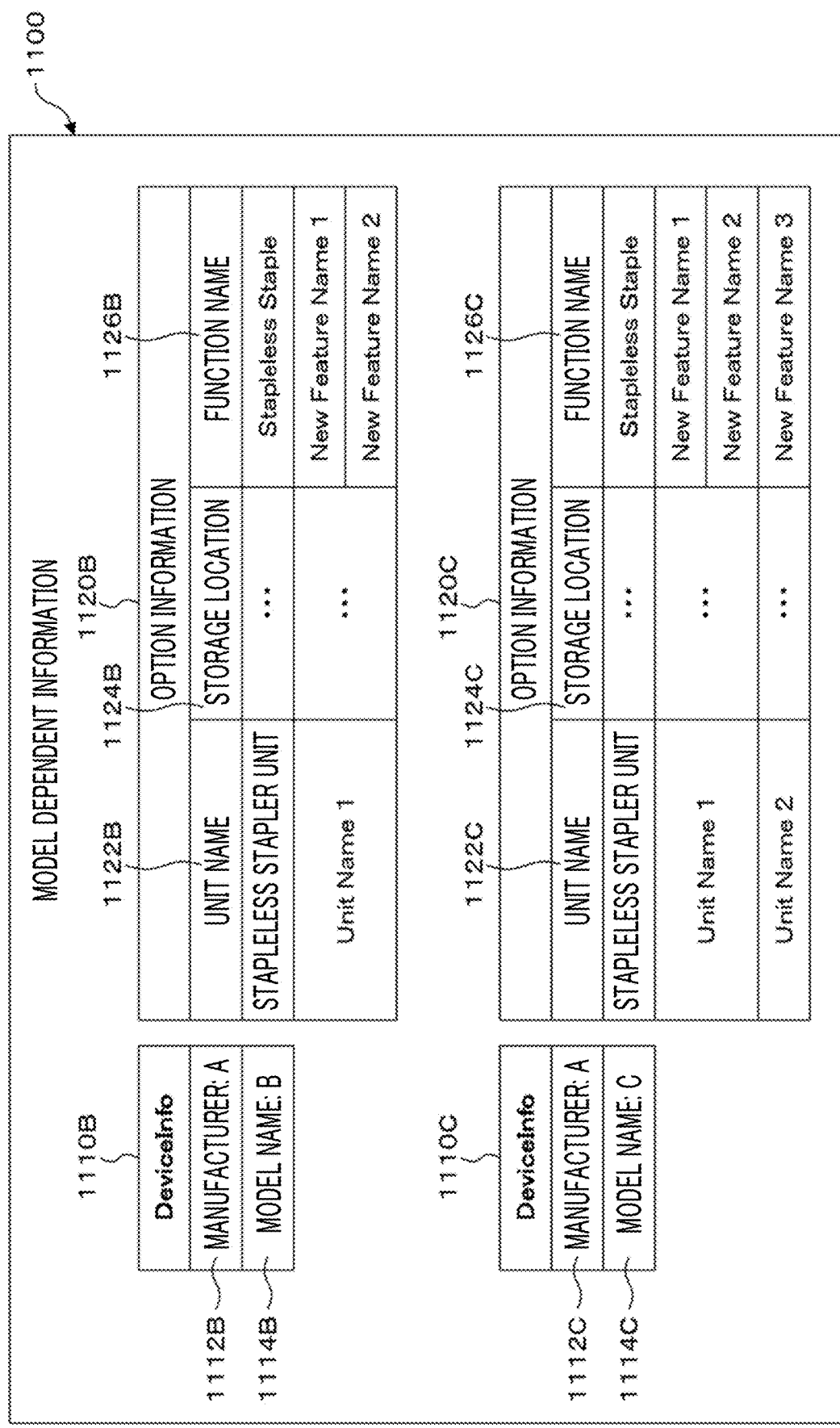
FIG. 11 is a diagram illustrating an example of a data structure of model dependent information.

The external apparatus 920 has functions as shown below.
Manage model dependent information. An example of the model dependent information is shown in FIG. 11 and will be described later.
Specify model dependent information from device information (also referred to as DeviceInfo).
Generate an instruction to acquire option information for each model and transmit the instruction to the common printer driver 900.
Cause option information received from the common printer driver 900 to be reflected on a print setting screen, generate print data, and transmit the print data to the common printer driver 900.

The common printer driver 900 has functions as shown below.
Transmit DeviceInfo, option information on the image processing apparatus 380 and print setting information to the external apparatus 920.
Receive an instruction required to acquire option information on the image processing apparatus 380 from the external apparatus 920.

The image processing apparatus 380 supports a stapleless stapler function, and the stapleless stapler unit is mounted.

An environment where the external apparatus 920, the common printer driver 900, and the image processing apparatus 380 are installed is present.

In step S952, the common printer driver 900 communicates with the image processing apparatus 380 by using Bidi to acquire the DeviceInfo from the image processing apparatus 380.

In step S954, the common printer driver 900 transmits the DeviceInfo to the external apparatus 920, and the external apparatus 920 specifies compatible model information. Specifically, the external apparatus 920 specifies the storage location (the MIB value and the like) of option information that the image processing apparatus 380 can take based on the DeviceInfo, and generates a list of inquiry destinations (storage location).

In step S956, the external apparatus 920 instructs the common printer driver 900 to acquire the option information on the image processing apparatus 380. Specifically, the external apparatus 920 transmits the generated inquiry destination list to the common printer driver 900. The printer driver in the related art and the V4 printer driver have different instruction formats, but have the same instruction content.

Figure 10:
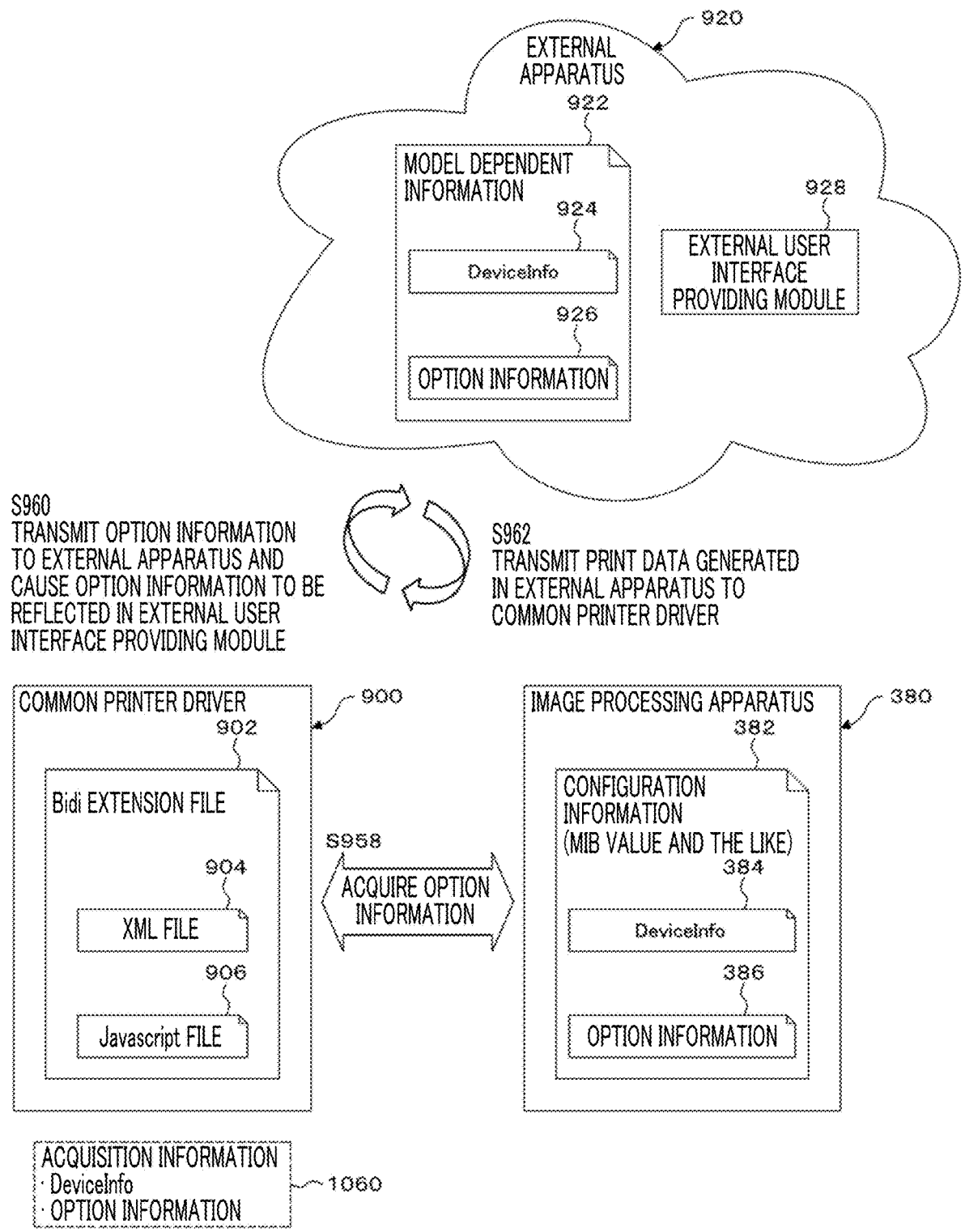
FIG. 10 is a diagram illustrating a processing example according to the present exemplary embodiment.

FIG. 10 is a diagram illustrating a processing example according to the present exemplary embodiment. FIG. 10 is a continuation of the processing example shown in the example of FIG. 9.

In step S958, the common printer driver 900 acquires the option information from the image processing apparatus 380. Specifically, the common printer driver 900 operates according to the inquiry destination list received from the external apparatus 920, and acquires the option information held by the image processing apparatus 380 by communication using Bidi again. Acquisition information 1060 includes, for example, the DeviceInfo and the option information. The option information cannot be reflected in the print setting screen by the common printer driver 900. Specifically, since the common printer driver 900 does not support the stapleless stapler function, the print setting screen for setting the stapleless stapler function cannot be generated.

In step S960, the common printer driver 900 transmits the option information to the external apparatus 920, and the external user interface providing module 928 of the external apparatus 920 causes the option information to be reflected in the print setting screen. Specifically, the common printer driver 900 transmits the acquired option information on the image processing apparatus 380 to the external apparatus 920, and then, the external apparatus 920 determines a function that is supported and causes the determined result to be reflected in the print setting screen. Further, FIG. 12 and FIG. 13 show a display example of the print setting screen in which the stapleless stapler is reflected and a display example in which the unsupported functions FeatureName1 and FeatureName2 other than the stapleless stapler exist in the option information.

Figure 12:
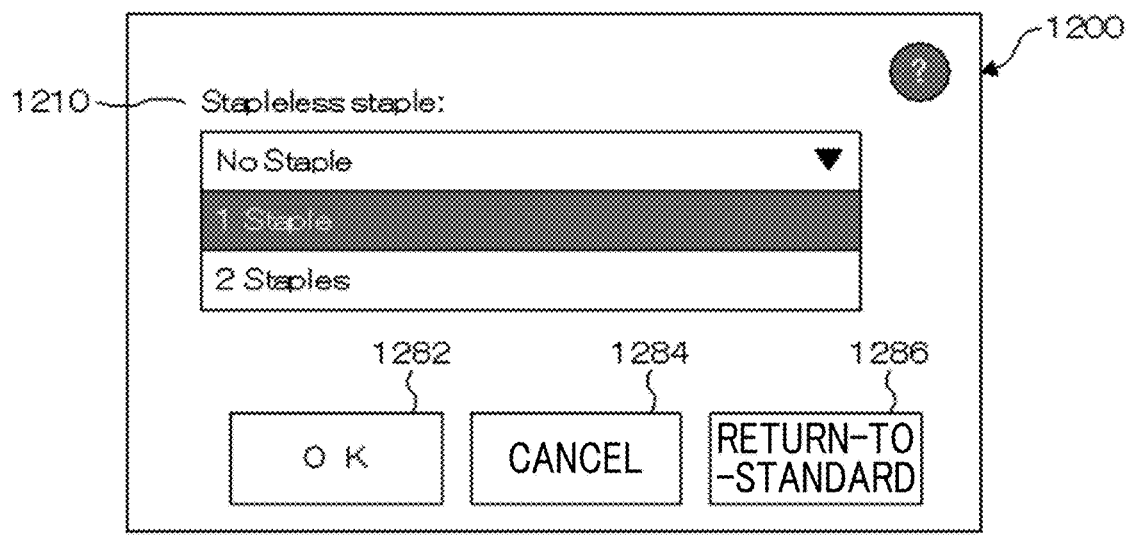
FIG. 12 is a diagram illustrating a display example of a print setting screen according to the present exemplary embodiment.

FIG. 12 is a diagram illustrating a display example of a print setting screen according to the present exemplary embodiment. The external user interface providing module 928 generates the print setting screen 1200. Then, the external apparatus 920 displays the print setting screen 1200 to the user via the web browser. The print setting screen 1200 is a screen for operating settings regarding the stapleless stapler which the image processing apparatus 380 has, although the common printer driver 900 is not supported.

The print setting screen 1200 displays a stapleless stapler setting area 1210, an OK button 1282, a cancel button 1284, and a return-to-standard button 1286. The user can set whether to use the stapleless stapler in the stapleless stapler setting area 1210. In a case where the OK button 1282 is selected, print processing is performed according to the settings in the stapleless stapler setting area 1210. In a case where the cancel button 1284 is selected, the setting in the stapleless stapler setting area 1210 is canceled. In a case where the return-to-standard button 1286 is selected, the setting in the stapleless stapler setting area 1210 is returned to a standard value.

Figure 13:
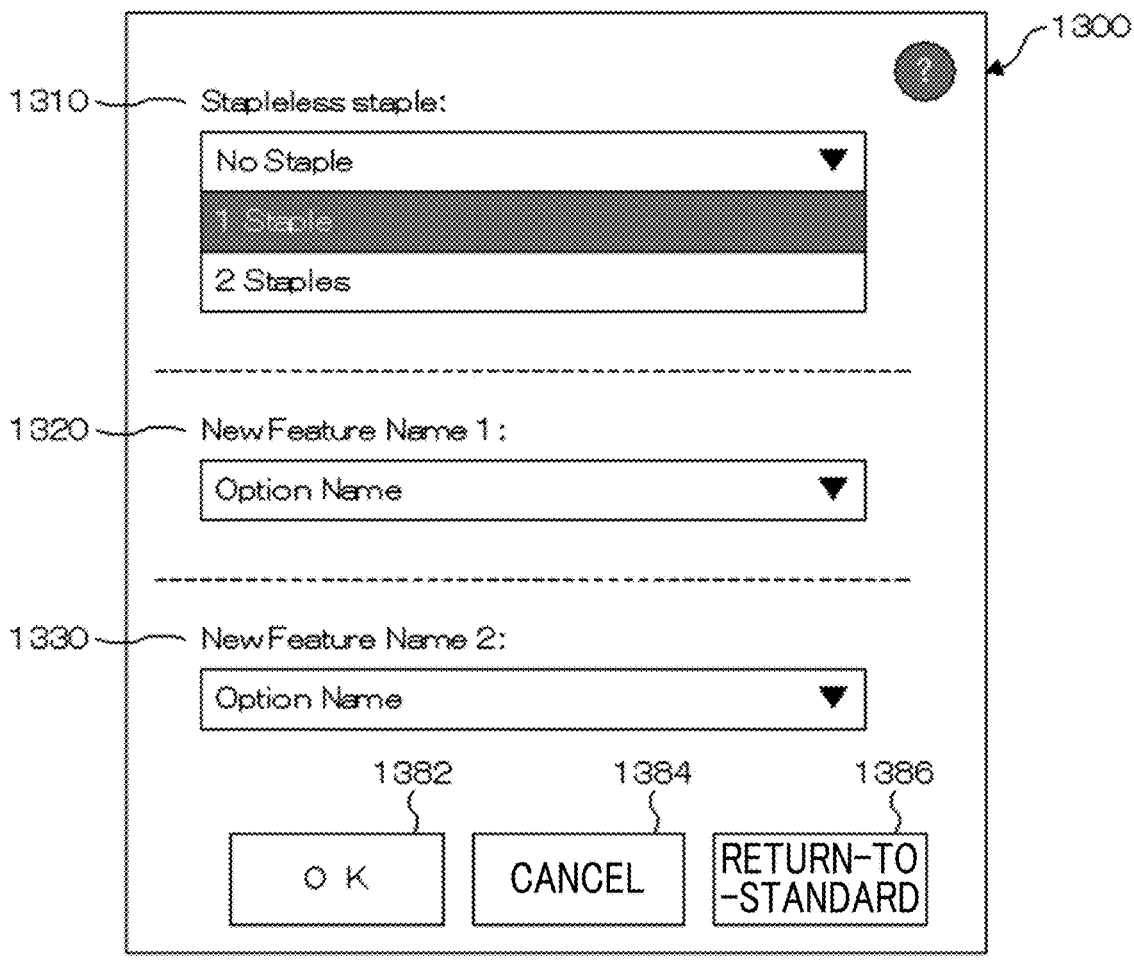
FIG. 13 is a diagram illustrating another display example of the print setting screen according to the present exemplary embodiment.

FIG. 13 is a diagram illustrating another display example of the print setting screen according to the present exemplary embodiment.

A print setting screen 1300 displays a stapleless stapler setting area 1310, a new function (1) setting area 1320, a new function (2) setting area 1330, an OK button 1382, a cancel button 1384, and a return-to-standard button 1386. The print setting screen 1300 is a screen for operating settings for a stapleless stapler, New Feature Name 1, and New Feature Name 2 by using the combination of DeviceInfo 1110B and option information 1120B shown in the example of FIG. 11.

In step S962, print data generated by the external apparatus 920 is transmitted to the common printer driver 900. Specifically, the external apparatus 920 generates print data in a format recognizable by the common printer driver 900 according to the print setting on the print setting screen, and transmits the print data to the common printer driver 900. Then, the common printer driver 900 transmits the print data to the image processing apparatus 380 to perform printing.

The processes not only make new development and updating of the common printer driver 900 unnecessary, but also makes it possible to acquire the configuration information on "stapleless stapler" unsupported by the common printer driver 900.

FIG. 11 is a diagram illustrating an example of a data structure of model dependent information 1100. The model dependent information 1100 is managed by the external apparatus 920.

The model dependent information 1100 includes a combination of DeviceInfo 1110 and the option information 1120. For example, a combination of the DeviceInfo 1110B and the option information 1120B, and a combination of DeviceInfo 1110C and option information 1120C exist.

The DeviceInfo 1110 has a manufacturer field 1112 and a model name field 1114. The option information 1120 has a unit name field 1122, a storage location field 1124, and a function name field 1126.

The combination of DeviceInfo 1110B and option information 1120B indicates that there are a storage location and a function name for the stapleless stapler unit, and Unit Name 1, as option information on the image processing apparatus 380 which is manufactured by the manufacturer A and the model name of which is B. Here, the storage location indicates a location where the setting value for the stapleless stapler unit (for example, information indicating whether the stapleless stapler unit is present, the position at which a hole is formed in the stapleless stapler, and the like) in the image processing apparatus 380 is stored, and corresponds to a predetermined memory address and the like. The function name is a name in case of being displayed on the print setting screen.

A combination of the DeviceInfo 1110C and the option information 1120C indicates that there are storage locations and function names for the stapleless stapler unit, Unit Name 1 and Unit Name 2 as option information on the image processing apparatus 380 which is manufactured by the manufacturer A and the model name of which is C.

FIG. 14 is a diagram illustrating a processing example according to the present exemplary embodiment. In the present exemplary embodiment, the processing as shown in the example of FIG. 14 may be performed.

The processing example shown in FIG. 14 is processing for acquiring configuration information on a new unit of the image processing apparatus 380 by a common printer driver 1400. For example, a stapleless stapler will be described as an example of a new unit.

The common printer driver 1400 has a Bidi extension file 1402 and an undefined option information storage area 1408. The common printer driver 1400 is obtained by adding the undefined option information storage area 1408 to the common printer driver 900 shown in the example of FIG. 9, and the Bidi extension file 1402 is the same as the Bidi extension file 902.

The Bidi extension file 1402 includes an XML file 1404 and a JavaScript file 1406.

The undefined option information storage area 1408 stores, for example, the MIB value and the like. The undefined option information storage area 1408 stores the "stapleless stapler" which the printer driver cannot convert or recognize, as an unknown value.

The image processing apparatus 380 stores the configuration information 382, and the configuration information 382 includes the DeviceInfo 384 and the option information 386.

An external apparatus 1420 has functions as shown below.
Manage model dependent information.
Decode option information which is not defined in the common printer driver 1400 based on the model dependent information.
Cause decoded undefined option information to be reflected in the print setting screen, generate print data, and transmit the print data to the common printer driver 1400.

The common printer driver 1400 has the following functions.
An area for storing undefined option information that cannot be converted or recognized by the common printer driver 1400 exists.
Transmit DeviceInfo of the image processing apparatus 380, option information, print setting information, and undefined option information that the common printer driver 1400 cannot convert or recognize, to an external apparatus 1420.

The image processing apparatus 380 supports a stapleless stapler function, and the stapleless stapler unit is mounted.

An environment where the external apparatus 1420, the common printer driver 1400, and the image processing apparatus 380 are installed exist.

The external apparatus 1420 includes model dependent information 1422, an external user interface providing module 1428, and an undefined option information decoding module 1430. The external apparatus 1420 is obtained by adding the undefined option information decoding module 1430 to the external apparatus 920 shown in the example of FIG. 9, the model dependent information 1422 is the same as the model dependent information 922, and the external user interface providing module 1428 is the same as the external user interface providing module 928.

The model dependent information 1422 includes DeviceInfo 1424 and option information 1426.

The undefined option information decoding module 1430 associates the model dependent information with the undefined option information.

In step S1452, the common printer driver 1400 communicates with the image processing apparatus 380 by using Bidi to acquire DeviceInfo, option information, and undefined option information. A value of undefined option information that cannot be converted or recognized by the common printer driver 1400 is stored in the undefined option information storage area 1408 as it is. In addition, a storage location (the MIB value and the like) of undefined option information in the image processing apparatus 380 is fixed. In a case where an image processing apparatus 380 of a new model is developed, option information (that is, the option information not supported by the common printer driver 1400) indicating a function which is a difference from a function supported by the common printer driver 1400 is stored in its own storage location.

In step S1454, the common printer driver 1400 transmits DeviceInfo, option information, and undefined option information to the external apparatus 1420.

In step S1456, the external apparatus 1420 cooperates with the model dependent information 1422, decodes undefined option information, and causes the external user interface providing module 1428 to reflect the undefined option information in the print setting screen for setting the undefined option information.

In step S1458, the external apparatus 1420 generates print data and transmits the print data to the common printer driver 1400. Specifically, the external apparatus 1420 generates print data in a format recognizable by the common printer driver 1400 according to the print setting on the print setting screen, and transmits the print data to the common printer driver 1400. Then, the common printer driver 1400 transmits the print data to the image processing apparatus 380 to perform printing.

An example of a hardware configuration of the information processing apparatus 100, the external apparatus 150, and the image processing apparatus 180 according to the present exemplary embodiment will be described with reference to FIG. 15. The configuration shown in FIG. 15 includes, for example, a personal computer and the like, and shows a hardware configuration example including a data reading unit 1517 such as a scanner and a data output unit 1518 such as a printer.

A central processing unit (for short, CPU) 1501 is the control unit that executes processes according to a computer program describing an execution sequence of each of various modules described in the above exemplary embodiments, that is, the communication module 105, the image processing apparatus communication module 110, the acquiring module 115, the user interface module 120, the display module 122, the receiving module 124, the control module 130, the communication module 155, the print setting screen generation module 165, the print information generation module 170, the common printer driver 400, the user interface providing module 611, the rendering module 612, the Bidi extension API 620, the port monitor 630, the external access control module 713b, the Bidi instruction generation module 751, the external user interface providing module 752, the external user interface providing module 928, the common printer driver 900, the common printer driver 1400, the external user interface providing module 1428, the undefined option information decoding module 1430.

A read only memory (for short, ROM) 1502 stores a program used by the CPU 1501, operation parameters, and the like. A random access memory (for short, RAM) 1503 stores a program used in execution of the CPU 1501, parameters which are appropriately changed in the execution, and the like. They are mutually connected by a host bus 1504 implemented by a CPU bus and the like.

The host bus 1504 is connected to an external bus 1506 such as a peripheral component interconnect/interface (for short, PCI) bus via a bridge 1505.

A keyboard 1508 and a pointing device 1509 such as a mouse are devices operated by the operator. A display 1510 is a liquid crystal display apparatus or a cathode ray tube (for short, CRT) and the like, and displays various information as a text or image information. In addition, a touch screen and the like provided with the functions of both the pointing device 1509 and the display 1510 may be used. In this case, for implementation of the function of the keyboard, a keyboard (also referred to as so-called a software keyboard, a screen keyboard, and the like) is drawn with software on a screen (for example, a touch screen) even without a physical connection like the keyboard 1508 to implement the function of the keyboard.

A hard disk drive (for short, HDD) 1511 incorporates a hard disk (may be a flash memory and the like in addition to the hard disk), and drives the hard disk to record or reproduce a program and information executed by the CPU 1501. The HDD 1511 functions as the storage module 160, the setting item/prohibition storage module 613*a*, the Bidi extension file storage module 614*a*, the device information storage module 642, an option information storage module 644, the device information storage module 753*a*, the option information storage module 753*b* and the like. For example, the configuration information 382, the DeviceInfo 384, the option information 386, the Bidi extension file 902, the XML file 904, the JavaScript file 906, the model dependent information 922, the DeviceInfo 924, the option information 926, the acquisition information 1060, the model dependent information 1100, the Bidi extension file 1402, the undefined option information storage area 1408, the model dependent information 1422, and the like are stored. Furthermore, various other data, various computer programs and the like are stored.

A drive 1512 reads out data or programs recorded in a removable recording medium 1513 such as a mounted magnetic disk, an optical disc, a magneto-optical disc, or a semiconductor memory, and the like, and provides the data or the program to the RAM 1503 connected via an interface 1507, the external bus 1506, the bridge 1505, and the host bus 1504. Additionally, the removable recording medium 1513 can also be used as a data recording area.

A connection port 1514 is a port for connection with an external connection device 1515, and has a connection unit such as a USB or an IEEE 1394. The connection port 1514 is connected to the CPU 1501 and the like via the interface 1507, the external bus 1506, the bridge 1505, the host bus 1504 and the like. A communication unit 1516 is connected to the communication line and executes data communication processing with the outside. The data reading unit 1517 is, for example, a scanner, and executes a document reading processing. The data output unit 1518 is, for example, a printer, and executes document data output processing.

For the computer program in the above-described exemplary embodiments, the exemplary embodiments are implemented by causing a system having the hardware configuration to read the computer program which is software, and making software and hardware resources cooperate with each other.

Figure 15:
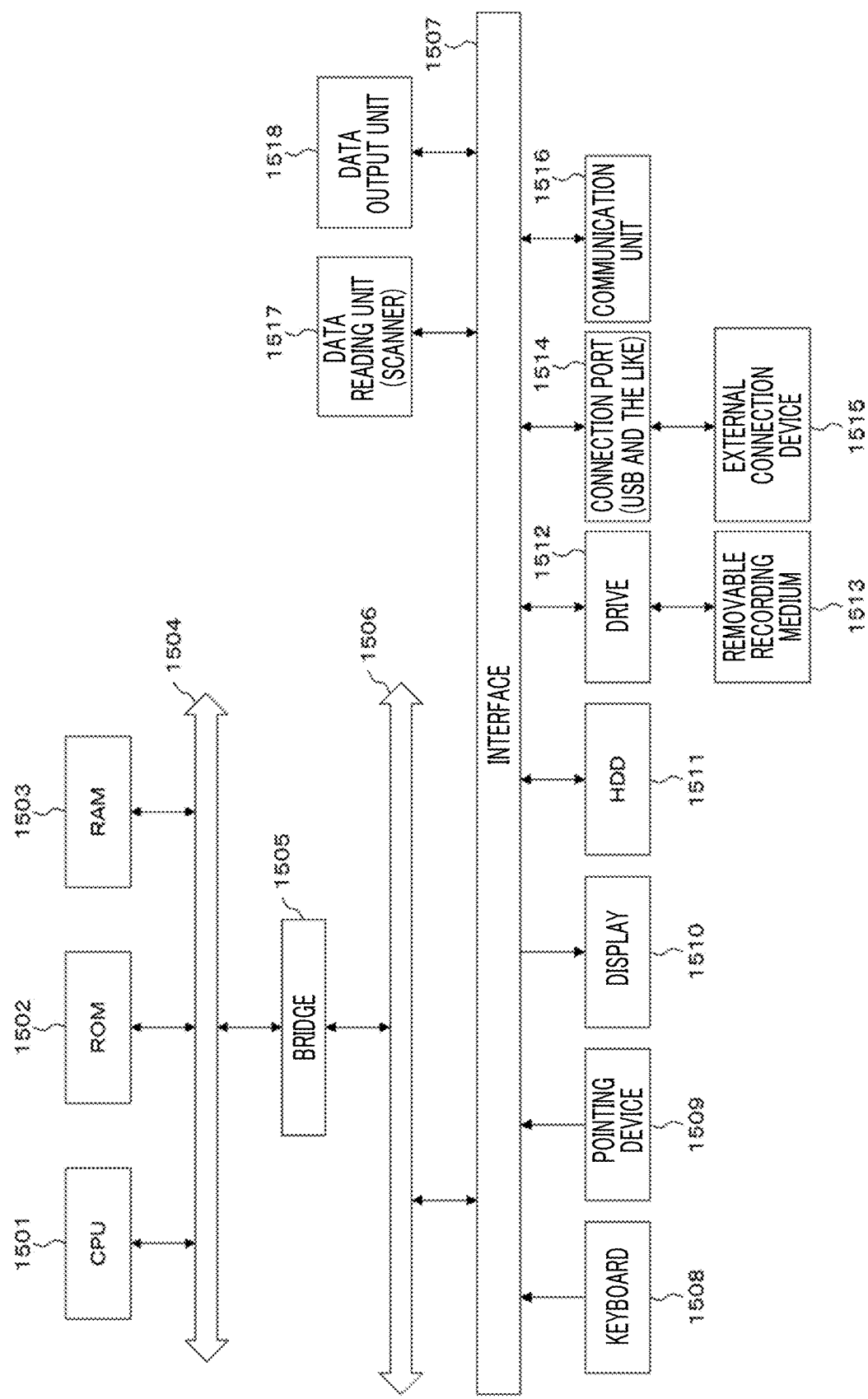
FIG. 15 is a block diagram illustrating a hardware configuration example of a computer that implements the present exemplary embodiment.

In addition, the hardware configuration of the information processing apparatus 100 and the like shown in FIG. 15 shows one configuration example. The present exemplary embodiment is not limited to the configuration shown in FIG. 15 and may be a configuration that can execute the modules described in the present exemplary embodiment. For example, some modules may be implemented by dedicated hardware (for example, an application specific integrated circuit (for short, ASIC) and the like) or a reconfigurable integrated circuit (as a specific example, a field-programmable gate array (for short, FPGA)), and may be included in the external system and connected with a communication line. Furthermore, plural systems shown in FIG. 15 may be connected with communication lines to cooperate with each other. Particularly, they may be incorporated in portable information communication devices, home information appliances, robots, copiers, fax machines, scanners, printers, multifunction machines, and the like, in addition to the personal computer.

Meanwhile, the above-described program may be provided through a recording medium storing the program, or may be provided through a communication unit. In these cases, for example, the program described above may be interpreted as an invention of "a computer-readable recording medium that stores the program".

The "computer-readable recording medium that stores the program" refers to a computer-readable recording medium that stores the program and is used for the installation and execution of the program and the distribution of the program.

Examples of the recording medium include a digital versatile disc (DVD) having a format of "DVD-R, DVD-RW, DVD-RAM, and the like" which is a standard developed by the DVD forum or having a format of "DVD+R, DVD+RW, and the like" which is a standard developed by the DVD+RW alliance, a compact disc (CD) having a format of CD read only memory (CD-ROM), CD recordable (CD-R), CD rewritable (CD-RW), and the like, a Blu-ray Disc (registered trademark), a magneto-optical disc (MO), a flexible disc (FD), a magnetic tape, a hard disk, a read only memory (ROM), an electrically erasable programmable ROM (EEPROM (registered trademark)), a flash memory, a random access memory (RAM), an secure digital (SD) memory card, and the like.

All or some of the above-described programs may be recorded on the recording medium for storage, distribution, or the like. In addition, the programs may be transmitted through communication, for example, by using a transmission media of, for example, a wired network which is used for a local area network (LAN), a metropolitan area network (MAN), a wide area network (WAN), the Internet, an intranet, an extranet, and the like, a wireless communication network, or a combination thereof, and may be carried on carrier waves.

Further, the above-described program may be a portion or all of another program, or may be recorded on a recording medium along with a separate program. The program may be divided and recorded on plural recording media. The program may be recorded in any format, such as compression or encryption, as long as the program can be restored.

The foregoing description of the exemplary embodiments of the present disclosure has been provided for the purposes of illustration and description. It is not intended to be exhaustive or to limit the present disclosure to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing system comprising:
an external apparatus; and
an information processing apparatus, wherein
the external apparatus comprises
   a storage configured to store model information indicating a model of an image processing apparatus and function information regarding a function of the image processing apparatus, and
   a print setting screen generator configured to generate a print setting screen in which a setting value transmitted from the information processing apparatus is reflected, by using the storage, and
the information processing apparatus comprises
   an acquiring unit configured to acquire a setting value of a function from the image processing apparatus, and a transmitter configured to transmit the setting value acquired by the acquiring unit to the external apparatus.

2. The information processing system according to claim 1, wherein
the external apparatus further comprises
a first transmitter configured to transmit the print setting screen generated by the print setting screen generator to the information processing apparatus,
a first receiver configured to receive a print setting value that is set using the print setting screen, from the information processing apparatus, and
a second transmitter configured to generate print information based on the print setting value and transmits the generated print information to the information processing apparatus, and
the information processing apparatus further comprises
a second receiver configured to receive the print setting screen transmitted from the external apparatus,
a receiver configured to receive a print setting value that is set by an operator, by using the print setting screen,
a third transmitter configured to transmit the print setting value received by the receiver to the external apparatus,
a third receiver configured to receive the print information transmitted from the external apparatus, and
a controller configured to control the image processing apparatus to perform printing, by using the print information received by the third receiver.

3. The information processing system according to claim 1, wherein
the information processing apparatus further comprises
a fourth transmitter configured to transmit the model information, which indicates the model, acquired from the image processing apparatus to the external apparatus,
the external apparatus further comprises
a fifth transmitter configured to transmit a storage location in model information corresponding to the model information received from the information processing apparatus, to the information processing apparatus, and
the acquiring unit of the information processing apparatus receives the storage location from the external apparatus, and acquires the setting value stored in the storage location of the image processing apparatus.

4. The information processing system according to claim 2, wherein
the information processing apparatus further comprises
a fourth transmitter configured to transmit the model information, which indicates the model, acquired from the image processing apparatus to the external apparatus,
the external apparatus further comprises
a fifth transmitter configured to transmit a storage location in model information corresponding to the model information received from the information processing apparatus, to the information processing apparatus, and
the acquiring unit of the information processing apparatus receives the storage location from the external apparatus, and acquires the setting value stored in the storage location of the image processing apparatus.

5. The information processing system according to claim 1, wherein
the information processing apparatus stores a storage location of undefined function information in the image processing apparatus in advance, and
the acquiring unit of the information processing apparatus acquires a setting value stored in the storage location of the image processing apparatus.

6. The information processing system according to claim 2, wherein
the information processing apparatus stores a storage location of undefined function information in the image processing apparatus in advance, and
the acquiring unit of the information processing apparatus acquires a setting value stored in the storage location of the image processing apparatus.

7. The information processing system according to claim 1, wherein the print setting screen generator of the external apparatus generates the print setting screen for a function different from a function in a print setting screen generated by the information processing apparatus.

8. The information processing system according to claim 2, wherein the print setting screen generator of the external apparatus generates the print setting screen for a function different from a function in a print setting screen generated by the information processing apparatus.

9. The information processing system according to claim 3, wherein the print setting screen generator of the external apparatus generates the print setting screen for a function different from a function in a print setting screen generated by the information processing apparatus.

10. The information processing system according to claim 4, wherein the print setting screen generator of the external apparatus generates the print setting screen for a function different from a function in a print setting screen generated by the information processing apparatus.

11. The information processing system according to claim 5, wherein the print setting screen generator of the external apparatus generates the print setting screen for a function different from a function in a print setting screen generated by the information processing apparatus.

12. The information processing system according to claim 6, wherein the print setting screen generator of the external apparatus generates the print setting screen for a function different from a function in a print setting screen generated by the information processing apparatus.

13. An information processing system comprising:
external means; and
information processing means, wherein
the external means comprises
storage means for storing model information indicating a model of image processing means and function information regarding a function of the image processing means, and
means for generating a print setting screen in which a setting value transmitted from the information processing means is reflected, by using the storage means, and
the information processing means comprises
means for acquiring a setting value of a function from the image processing means, and
means for transmitting the acquired setting value to the external means.

* * * * *